US012764112B2

(12) United States Patent
Zhang et al.

(10) Patent No.: US 12,764,112 B2
(45) Date of Patent: Oct. 13, 2026

(54) SECURITY VERIFICATION METHOD AND APPARATUS

(71) Applicant: HUAWEI TECHNOLOGIES CO., LTD., Shenzhen (CN)

(72) Inventors: Zheng Zhang, Shenzhen (CN); Fei Li, Boulogne Billancourt (FR); Zaifeng Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 18/926,758

(22) Filed: Oct. 25, 2024

(65) Prior Publication Data

US 2025/0047674 A1 Feb. 6, 2025

Related U.S. Application Data

(63) Continuation of application No. PCT/CN2023/083977, filed on Mar. 27, 2023.

(30) Foreign Application Priority Data

Apr. 26, 2022 (CN) ......................... 202210446683.8

(51) Int. Cl.
*H04L 9/40* (2022.01)

(52) U.S. Cl.
CPC ...... *H04L 63/0876* (2013.01); *H04L 63/0892* (2013.01)

(58) Field of Classification Search
CPC . H04L 63/0876; H04L 63/0892; H04L 63/12; H04L 63/123; H04L 63/126;
(Continued)

(56) References Cited

U.S. PATENT DOCUMENTS 9,792,472 B1 * 10/2017 Robshaw ........... G06K 7/10257
9,916,483 B1 3/2018 Robshaw et al.
(Continued)

FOREIGN PATENT DOCUMENTS

CN 102629332 A 8/2012
CN 102904723 A 1/2013
(Continued)

OTHER PUBLICATIONS

Jianqing Fu et al: "Scalable pseudo random RFID private mutual authentication", Computer Engineering and Technology (ICCET), 2010 2nd International Conference on, IEEE, Piscataway, NJ, USA, Apr. 16, 2010, total 4 pages.
(Continued)

*Primary Examiner* — Baotran N To
(74) *Attorney, Agent, or Firm* — Rimon PC

(57) ABSTRACT

Embodiments of this application disclose a security verification method and apparatus. The method includes receiving a first command from a network device, where the first command includes a first value, and the first command is one of a select command, a query command, a query repeat command, a query adjust command, or an acknowledgment command. The method further includes determining a first response value based on the first value and a security key; and sending a first request, where the first request includes the first response value, and the first response value is used by a verification function to verify a terminal device. According to embodiments of this application, communication security can be ensured.

20 Claims, 9 Drawing Sheets

(58) Field of Classification Search
CPC . H04W 12/009; H04W 12/041; H04W 12/06; H04W 12/069; H04W 12/106; H04W 12/108; H04W 12/47; H04W 12/122
See application file for complete search history.

(56) References Cited

U.S. PATENT DOCUMENTS

| | | | | |
|---|---|---|---|---|
| 2010/0001840 A1* | 1/2010 | Kang | H04Q 9/00 | 340/10.1 |
| 2010/0283614 A1* | 11/2010 | Soppera | H04L 63/062 | 380/270 |

FOREIGN PATENT DOCUMENTS

| | | | |
|---|---|---|---|
| CN | 106951934 | A | 7/2017 |
| KR | 20070054885 | A | 5/2007 |

OTHER PUBLICATIONS

ISO 18000-6C: "EPC™ Radio-Frequency Identity Protocols Class-1 Generation-2 UHF RFID Protocol for Communications at 860 MHZ—960 MHz Version 1.2.0." Oct. 23, 2008, total 108 pages.

3rd Generation Partnership Project; Technical Specification Group Services and System Aspects; System architecture for the 5G System (5GS); Stage 2 (Release 17), 3GPP TS 23.501 V17.4.0 (Mar. 2022), total 567 pages.

3rd Generation Partnership Project; Technical Specification Group Services and System Aspects; Security architecture and procedures for 5G system (Release 17), 3GPP TS 33.501 V17.5.0 (Mar. 2022), total 293 pages.

* cited by examiner

SECURITY VERIFICATION METHOD AND APPARATUS

CROSS-REFERENCE TO RELATED APPLICATIONS

This application is a continuation International Application No. PCT/CN2023/083977, filed on Mar. 27, 2023, which claims priority to Chinese Patent Application No. 202210446683.8, filed on Apr. 26, 2022. The disclosures of the aforementioned applications are hereby incorporated by reference in their entireties.

TECHNICAL FIELD

This application relates to the field of communication technologies, and in particular, to a security verification method and apparatus.

BACKGROUND

A conventional passive radio frequency identification (RFID) tag (also referred to as an electronic tag) is used together with a transceiver function of a reader. However, this setup has drawbacks such as high deployment costs and low inventory efficiency. In a 5th generation (5G) mobile communication technology scenario, the reader is integrated into a base station, and an enterprise performs tag connection management, reader connection management, a tag positioning function, and network capability exposure via a 5G core network (5GC). Because the reader is integrated into the base station, the communication distance between the tag and the reader becomes longer, which may result in network security vulnerabilities. For example, the tag may be killed in an unauthorized way, information may be written into the tag in an unauthorized way, reported data may be eavesdropped, the reported data may be tampered with, or the tag may be forged to report data.

SUMMARY

Embodiments of this application provide a security verification method and apparatus, to ensure communication security between a terminal device and a network device.

According to a first aspect, an embodiment of this application provides a security verification method, including:

receiving a first command sent by a network device, where the first command includes a first value, and the first command is one of a select command, a query command, a query repeat command, a query adjust command, or an acknowledgment command; determining a first response value based on the first value and a security key; and sending a first request, where the first request includes the first response value, and the first response value is used by a verification function to verify a terminal device.

The terminal device determines the first response value based on the first value included in the received first command (for example, the select command, the query command, the query repeat command, the query adjust command, or the acknowledgment command) of the network device, and sends the first response value to the verification function, so that the verification function verifies the terminal device. This avoids a case in which an unauthorized terminal device accesses a network, and avoids a case in which data reported by the terminal device is eavesdropped, the reported data is tampered with, or the terminal device is forged to report data. Therefore, communication security between the terminal device and the network device is ensured. For example, a malicious third party eavesdrops on communication between a reader and a tag, and forges the tag to report data to the reader. The terminal device is verified to avoid a case in which the data reported by the tag is tampered with, and avoid a case in which the tag is forged to report data. Therefore, communication security between the reader and the tag is ensured. Because the first value generated by the network device is sent to the terminal device by using the first command, a quantity of interactions between the terminal device and the network device can be reduced, thereby reducing signaling overheads.

In a possible design, the first request further includes a second value, and the second value is used by the verification function to determine a second response value, and the method further includes: receiving a first response message, where the first response message includes the second response value; and verifying the network device based on the second response value. The terminal device verifies the network device by receiving the second response value determined by the verification function. This avoids leakage of tag information of valuables caused by a malicious network device sending an inventory instruction to obtain electronic product code (EPC) information of the terminal device by using a random access command. For example, a case in which a tag is killed in an unauthorized way or information is written into the tag in an unauthorized way is avoided. Therefore, communication security between the terminal device and the network device is ensured.

In another possible design, a third response value is determined based on the second value and the security key. It is determined whether the second response value is the same as the third response value. When the second response value is the same as the third response value, it is determined that the network device passes verification. The network device is verified by determining whether the second response value calculated by the verification function is the same as the third response value calculated by the terminal device, to ensure verification accuracy.

In another possible design, the first response message further includes an electronic product code EPC, and the EPC is used to identify the terminal device. The network device is verified based on the first response value in the first response message, to ensure authenticity of the EPC sent by the network device.

In another possible design, an access and mobility management function (AMF) or a tag management function (TMF) sends a first verification result to the verification function, where the first verification result is a verification result of the network device.

In another possible design, the first request further includes the electronic product code EPC, and the EPC is used to identify the terminal device; and/or the verification function includes an application function or an authentication, authorization, and accounting function. The terminal device is verified based on the first response value in the first request, to ensure authenticity of the EPC sent by the terminal device.

In another possible design, the first command is one of the select command, the query command, the query repeat command, the query adjust command, or the acknowledgment command.

The select command includes the following parameters:

Target, indicating whether to change a selected flag (SL) or an inventoried flag of a tag, where when the inventoried flag is changed, a session is specified;

Action, indicating whether tags that meet a condition declare SLs or not, or used to set inventoried flags of the tags to A or B;

MemBank, indicating whether a mask is used in an EPC, a tag identifier (TID), or a user zone;

Pointer and Length, indicating a storage range; and

Truncate, indicating whether a reply of the tag is truncated.

The query command includes the following parameters:

DR, used to set a T=>R (tag-to-reader) link frequency;

M, used to set a T=>R data rate and a modulation format;

TRext, used to choose whether to add a lead signal to a T=>R frame header;

Sel, used to select tags to respond to a query;

Session, used to select a session for an inventory periodicity;

Target, used to select A or B as an inventoried flag of a tag participating in the inventory periodicity; and Q, used to set a quantity of slots in the inventory periodicity.

The query repeat (QueryRep) command includes the following parameter:

Session, used to confirm a session value of a current inventory periodicity.

The query adjust command includes the following parameters:

Session, used to confirm a session value of a current inventory periodicity; and UpDn, used to determine whether the tag adjusts a Q value (for example, a quantity of slots in the inventory periodicity) and how the tag adjusts the Q value.

The acknowledgment (ACK) command includes the following parameter:

RN16, which is a 16-bit random number or pseudo random number.

According to a second aspect, an embodiment of this application provides a security verification method, including:

A verification function receives a first request, where the first request includes a first response value, the first response value is determined based on a security key and a first value included in a first command of a network device, and the first command is one of a select command, a query command, a query repeat command, a query adjust command, or an acknowledgment command. The verification function verifies a terminal device based on the first response value.

The terminal device determines the first response value based on the first value included in the received first command (for example, the select command, the query command, the query repeat command, the query adjust command, or the acknowledgment command) of the network device, and sends the first response value to the verification function, so that the verification function verifies the terminal device. This avoids a case in which an unauthorized terminal device accesses a network, and avoids a case in which data reported by the terminal device is eavesdropped, the reported data is tampered with, or the terminal device is forged to report data. Therefore, communication security between the terminal device and the network device is ensured. For example, a malicious third party eavesdrops on communication between a reader and a tag, and forges the tag to report data to the reader. The terminal device is verified to avoid a case in which the data reported by the tag is tampered with, and avoid a case in which the tag is forged to report data. Therefore, communication security between the reader and the tag is ensured. Because the first value generated by the network device is sent to the terminal device by using the first command, a quantity of interactions between the terminal device and the network device can be reduced, thereby reducing signaling overheads.

In a possible design, the verification function determines a third value, and determines a fourth response value based on the third value and the security key. The verification function determines whether the first response value is the same as the fourth response value. When the first response value is the same as the fourth response value, the verification function determines that the terminal device passes verification.

The terminal device is verified by determining whether the fourth response value calculated by the verification function is the same as the first response value calculated by the terminal device, to ensure verification accuracy.

In another possible design, the first request further includes a second value. The verification function determines a second response value based on the second value and the security key. The verification function sends a first response message, where the first response message includes the second response value, and the second response value is used by the terminal device to verify the network device. The verification function sends the second response value to the terminal device, so that the terminal device verifies the network device based on the second response value. This avoids leakage of tag information of valuables caused by a malicious network device sending an inventory instruction to obtain EPC information of the terminal device by using a random access command. For example, a case in which the tag is killed in an unauthorized way or information is written into the tag in an unauthorized way is avoided. Bidirectional verification between the terminal device and the network device is implemented. Therefore, communication security between the terminal device and the network device is ensured.

In another possible design, the verification function receives a first verification result sent by the terminal device via an AMF or a TMF, where the first verification result is a verification result of the network device.

In another possible design, the verification function sends a second response message to the AMF or the TMF, where the second response message includes a derived key, the derived key is generated based on the security key, an electronic product code EPC, and at least one of the first value or the second value, and the EPC is used to identify the terminal device. The AMF or the TMF performs encryption or integrity protection on signaling by using the derived key, to ensure communication security.

In another possible design, the second response message further includes a second verification result, and the second verification result is a verification result of the terminal device.

According to a third aspect, an embodiment of this application provides a security verification method, including:

An AMF or a TMF determines a first value; and sends a second command to a network device, where the second command includes the first value, and the second command is an inventory command.

The first value is sent to the network device by using the inventory command, so that the network device delivers a first command to a terminal device. In this way, the terminal device determines a first response value based on the first value in the first command. This reduces interaction processes between the terminal device and the network device, and reduces signaling overheads.

In a possible design, the AMF or the TMF receives a second request sent by a verification function, where the second request includes the first value; or the first value is generated by the AMF or the TMF.

In another possible design, the AMF or the TMF receives a second response message sent by the verification function, where the second response message includes a derived key, the derived key is generated based on the security key, an electronic product code EPC, and at least one of the first value or the second value, and the EPC is used to identify the terminal device. Encryption or integrity protection is performed on signaling by using the derived key, to improve communication security.

In another possible design, the second response message further includes a second verification result, and the second verification result is a verification result of the terminal device.

According to a fourth aspect, an embodiment of this application provides a security verification system, including:

An AMF or a TMF determines a first value; and sends a second command to a network device, where the second command includes the first value, and the second command is an inventory command.

A verification function receives a first request, where the first request includes a first response value, the first response value is determined based on a security key and the first value included in a first command of the network device, and the first command is one of a select command, a query command, a query repeat command, a query adjust command, or an acknowledgment command; and verifies a terminal device based on the first response value.

The verification function verifies the terminal device by receiving the first response value determined by the terminal device. Therefore, communication security between the terminal device and the network device is ensured. Because the first value generated by the network device is sent to the terminal device by using the first command, a quantity of interactions between the terminal device and the network device can be reduced, thereby reducing signaling overheads.

In a possible design, the network device sends the first command to the terminal device, where the first command includes the first value.

According to a fifth aspect, an embodiment of this application provides a security verification method, including:

After receiving an access command of a network device, a terminal device generates a first value, where the access command is one of Write, Kill, and Lock. The terminal device sends the first value. The terminal device receives a first response value from a verification function, where the first response value is calculated based on the first value. The terminal device verifies the network device based on the first response value.

After receiving the access command, the terminal device initiates verification on the network device, and executes the access command after the network device passes the verification, to avoid a case in which a malicious base station initiates a command such as a read command, a write command, or a kill command to the terminal device. Therefore, communication security between the terminal device and the network device is ensured.

In a possible design, the terminal device receives a second value from the verification function. The terminal device calculates a second response value based on the second value and a security key. The terminal device sends the second response value, where the second response value is used by the verification function to verify the terminal device. The terminal device calculates the second response value, and sends the second response value to the verification function, so that the verification function verifies the terminal device. Therefore, communication security between the terminal device and the network device is ensured.

In another possible design, the terminal device determines a third response value based on the first value and the security key. The terminal device determines whether the first response value is the same as the third response value. When the first response value is the same as the third response value, the terminal device determines that the network device passes the verification.

The network device is verified by determining whether the first response value calculated by the verification function is the same as the third response value calculated by the terminal device, to ensure verification accuracy.

In another possible design, the first value is included in a first request, the first response value is included in a first response message, the first response message and/or the first request further include/includes an EPC, and the EPC is used to identify the terminal device.

In another possible design, the verification function includes an application function or an authentication, authorization, and accounting function.

According to a sixth aspect, an embodiment of this application provides a security verification apparatus. The apparatus includes:

- a receiving module, configured to receive a first command sent by a network device, where the first command includes a first value, and the first command is one of a select command, a query command, a query repeat command, a query adjust command, or an acknowledgment command;
- a processing module, configured to determine a first response value based on the first value and a security key; and
- a sending module, configured to send a first request, where the first request includes the first response value, and the first response value is used by a verification function to verify a terminal device.

The modules in this application may be implemented as hardware, software, or a combination of hardware and software. A module in this application may be a circuit. For example, the receiving module may be a receiving circuit, the processing module may be a processing circuit and the sending module may be a sending circuit. For implementation of each module, refer to corresponding descriptions in the method embodiment in the first aspect, to perform the method and the functions performed by the foregoing terminal device.

For operations performed by the security verification apparatus and beneficial effects thereof, refer to the method in the first aspect and the beneficial effects thereof. Repeated content is not described again.

According to a seventh aspect, an embodiment of this application provides a security verification apparatus. The apparatus includes:

- a receiving module, configured to receive a first request, where the first request includes a first response value, the first response value is determined based on a security key and a first value included in a first command of a network device, and the first command is one of a select command, a query command, a query repeat command, a query adjust command, or an acknowledgment command; and a processing module, configured to verify a terminal device based on the first response value.

For implementation of each module, refer to corresponding descriptions in the method embodiment in the second aspect, to perform the method and the functions performed by the foregoing verification function.

For operations performed by the security verification apparatus and beneficial effects thereof, refer to the method in the second aspect and the beneficial effects thereof. Repeated content is not described again.

According to an eighth aspect, an embodiment of this application provides a security verification apparatus, including:

a processing module, configured to determine a first value; and a sending module, configured to send a second command to a network device, where the second command includes the first value, and the second command is an inventory command.

For implementation of each module, refer to corresponding descriptions in the method embodiment in the third aspect, to perform the method and the functions performed by the foregoing AMF or TMF.

For operations performed by the security verification apparatus and beneficial effects thereof, refer to the method in the third aspect and the beneficial effects thereof. Repeated content is not described again.

According to a ninth aspect, an embodiment of this application provides a security verification apparatus, including:

a processing module, configured to generate a first value after receiving an access command of a network device, where the access command is one of Write, Kill, and Lock;

a sending module, configured to send the first value; and a receiving module, configured to receive a first response value from a verification function, where the first response value is calculated based on the first value. A terminal device verifies the network device based on the first response value.

For implementation of each module, refer to corresponding descriptions in the method embodiment in the fifth aspect, to perform the method and the functions performed by the foregoing terminal device.

For operations performed by the security verification apparatus and beneficial effects thereof, refer to the method in the fifth aspect and the beneficial effects thereof. Repeated content is not described again.

According to a tenth aspect, this application provides a security verification apparatus. The apparatus may be a terminal device, an apparatus in the terminal device, or an apparatus that can be used together with the terminal device. The apparatus may alternatively be a verification function, an apparatus in the verification function, or an apparatus that can be used together with the verification function. The apparatus may alternatively be an AMF or a TMF, an apparatus in the AMF or the TMF, or an apparatus that can be used to together with the AMF or the TMF. The security verification apparatus may alternatively be a chip system. The security verification apparatus may perform the foregoing method. Functions of the security verification apparatus may be implemented by hardware, or may be implemented by hardware executing corresponding software. The hardware or the software includes one or more modules corresponding to the functions. The module may be software and/or hardware. For operations performed by the security verification apparatus and beneficial effects thereof, refer to the methods in the first aspect and the fifth aspect and the beneficial effects thereof. Repeated content is not described again.

According to an eleventh aspect, this application provides a security verification apparatus. The security verification apparatus includes a processor and a memory, and when the processor invokes a computer program in the memory, the method according to any one of the first aspect, the second aspect, the third aspect, and the fifth aspect is performed.

According to a twelfth aspect, this application provides a computer-readable storage medium. The computer-readable storage medium is configured to store a computer program, and when the computer program is executed, the method or the system according to any one of the first aspect to the fifth aspect is implemented.

According to a thirteenth aspect, this application provides a computer program product including a computer program. When the computer program is executed, the method or the system according to any one of the first aspect to the fifth aspect is implemented.

According to a fourteenth aspect, an embodiment of this application provides a communication system. The communication system includes at least one terminal device and at least one verification function. The terminal device is configured to perform the steps in the first aspect and the fifth aspect, and the verification function is configured to perform the steps in the second aspect.

According to a fifteenth aspect, an embodiment of this application provides a communication system. The communication system includes at least one verification function and at least one AMF or TMF. The verification function is configured to perform the steps in the second aspect, and the AMF or the TMF is configured to perform the steps in the third aspect.

According to a sixteenth aspect, an embodiment of this application provides a communication system. The communication system includes at least one terminal device, at least one verification function, and at least one AMF or TMF. The terminal device is configured to perform the steps in the first aspect and the fifth aspect, the verification function is configured to perform the steps in the second aspect, and the AMF or the TMF is configured to perform the steps in the third aspect.

BRIEF DESCRIPTION OF DRAWINGS

To describe the technical solutions in embodiments of this application or in the background more clearly, the following describes the accompanying drawings for describing embodiments of this application or the background.

DESCRIPTION OF EMBODIMENTS

Figure 1:
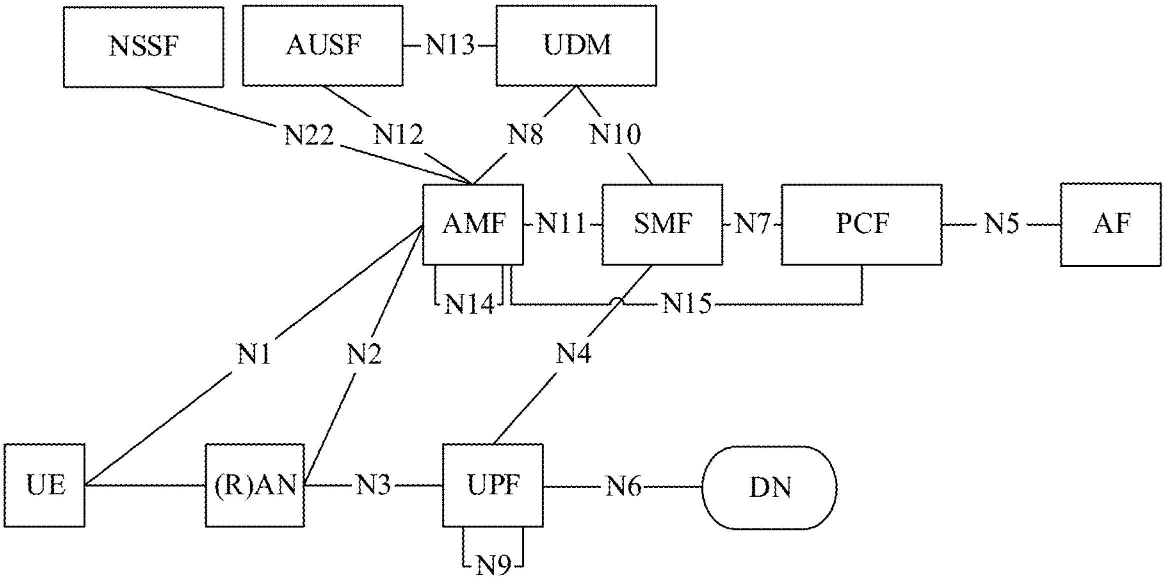
FIG. 1 is a diagram of an architecture of a 5th generation (5G) system.

FIG. 1 is a diagram of an architecture of a 5G system. The 5G system includes two parts: an access network and a core network. The access network is configured to implement a function related to radio access. The core network may include the following key logical network elements: an access and mobility management function (AMF) entity, a session management function (SMF) entity, a user plane function (UPF) entity, a policy control function (PCF) entity, a unified data management (UDM) entity, and an application function (AF) entity.

Optionally, the core network may further include a tag management function (TMF), an authentication, authorization, and accounting (AAA) entity, and a network capability exposure function (NEF) entity.

The following describes network elements involved in FIG. 1.

UE may be an electronic device, for example, a mobile phone or an internet of things terminal device.

A radio access network ((R) AN) device is a device that provides radio access for the UE, and includes but is not limited to a 5G base station (next generation NodeB, gNB), a wireless fidelity (Wi-Fi) access point (AP), a worldwide interoperability for microwave access (WiMAX) base station (BS), and the like.

The AMF entity is responsible for mobility management in a mobile network, for example, user location update, registration of a user with a network, and user switching.

The SMF entity is responsible for session management in the mobile network, for example, session establishment, modification, and release. One of its functions is, for example, allocating an IP address to a user or selecting a UPF that provides a packet forwarding function.

The PCF entity is responsible for providing policies such as a quality of service (QoS) policy and a slice selection policy for the AMF and the SMF.

The UDM entity is configured to store user data such as subscription information and authentication/authorization information.

The AF entity is responsible for providing a service for a 3rd generation partnership project (3GPP) network, for example, affecting service routing, and interacting with the PCF to perform policy control.

The UPF entity is responsible for processing a user packet, for example, forwarding and charging the user packet.

The NEF entity is configured to: expose a capability of each network element in the 3GPP to another network element, and provide corresponding security assurance to ensure security of an external application in the 3GPP network.

A data network (DN) is responsible for providing a data transmission service for the user, for example, an IP multimedia service (IMS) or the internet. The UE accesses the DN by establishing sessions among the UE, the RAN, the UPF, and the DN.

In FIG. 1, the network functions and entities may exchange messages through different interfaces. For example, the UE and the AMF entity may interact with each other through an N1 interface, where an exchanged message is referred to as an N1 message. Some interfaces are implemented as service-oriented interfaces. The UE, the RAN device, the UPF entity, and the DN in FIG. 1 may be referred to as network functions and entities on a data plane, and are configured to carry service data. User-layer data traffic may be transmitted by using a PDU session established between the UE and the DN, and passes through two network function entities: the RAN device and the UPF entity. Other network functions and entities may be collectively referred to as network functions and entities on a control plane, are configured to carry signaling messages, and may be responsible for functions such as authentication and authorization, registration management, session management, mobility management, and policy control, to ensure reliability and stability of user-layer data traffic transmission.

Radio frequency identification (RFID) is a non-contact automatic identification technology in which non-contact bidirectional data communication is performed in a radio frequency manner and a tag is read or written. In this way, data communication between a reader and the tag is implemented, and target identification and data exchange are implemented. Generally, after the tag enters an electromagnetic field transmitted by the reader, an induced current obtained from an antenna is converted into a power supply of a chip through a boost circuit, and energy obtained from the induced current is converted into a data signal through a radio frequency front-end circuit and sent to a logic control circuit for processing. When reply information is sent from a memory of the tag, the information is sent back to the radio frequency front-end circuit through the logic control circuit, and finally sent back to the reader via the antenna.

Figure 2:
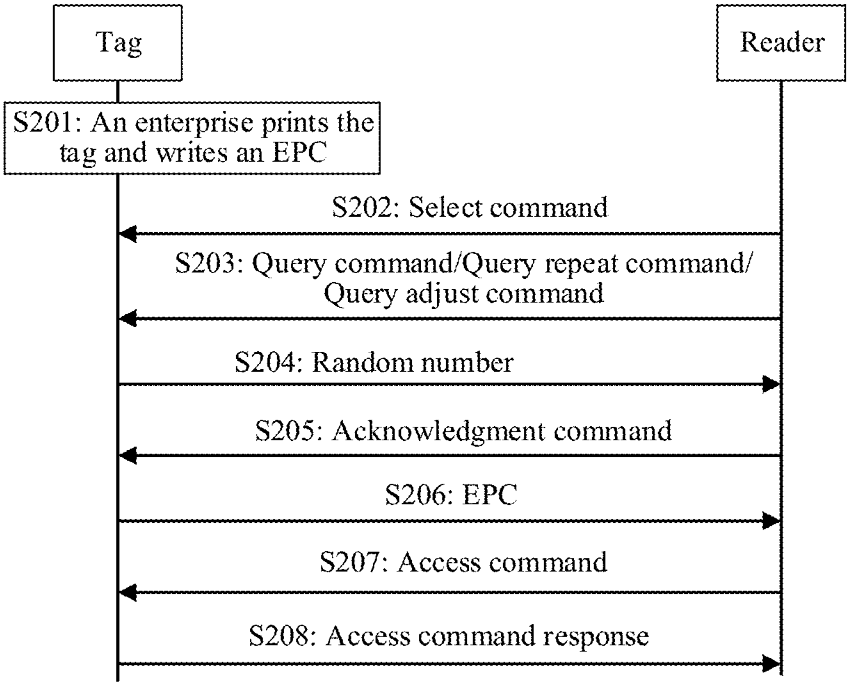
FIG. 2 is a diagram of an radio frequency identification (RFID) service process.

FIG. 2 is a diagram of an RFID service process. A process in some embodiments includes the following steps.

- S201: an enterprise prints a tag, and writes an electronic product code (EPC), where the EPC is used to identify an attached item.
- S202: a reader sends a select command to select a tag group for inventory and access. Prior to the inventory, the reader uses one or more select commands to select a tag group.
- S203: the reader starts an inventory periodicity by sending a query command. Alternatively, the reader starts an inventory periodicity of a next tag by using a query repeat (Query Rep) command and a query adjust (Query Adjust) command.
- S204: a selected tag returns RN16 to the reader. RN16 may represent a 16-bit random number.
- S205: the reader sends an ACK command to the tag, where the ACK command carries RN16. The ACK command is used to acknowledge RN16 replied by the tag.
- S206: after receiving the ACK command, the tag responds to the electronic product code EPC, and sends the EPC to the reader.
- S207: the reader sends an access command to the tag, to perform an operation such as read or write.
- S208: the tag sends an access command response to the reader.

The access command may include: Req_RN: requesting new RN16; Read: reading data; Write: writing data; Kill: killing the tag (where a kill password is needed); Lock: a lock operation (where a locked area cannot be read/written); Access: switching the tag to a secured state, in other words, performing the lock operation (where an access password is needed); BlockWrite: a multi-word write operation; and BlockErase: a multi-word erase operation.

Figure 3:
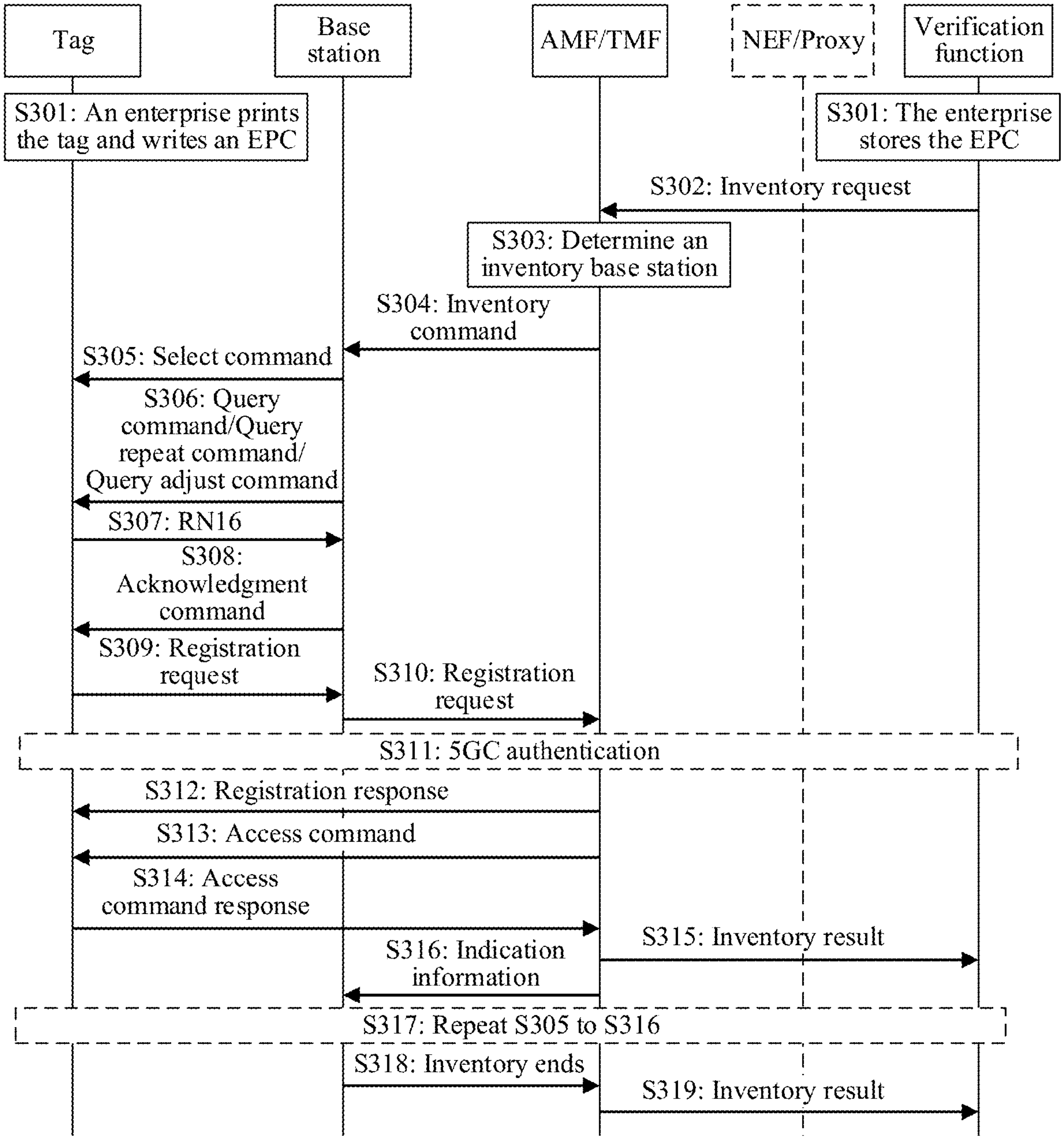
FIG. 3 is a diagram of a service process of a tag after a reader is integrated into a base station.

In a 5G scenario, the reader is integrated into a base station, and the enterprise completes capabilities such as tag connection management, reader connection management, a tag positioning function, and network capability exposure via a 5GC. FIG. 3 is a diagram of a service process of a tag after a reader is integrated into a base station. The process may include the following steps.

S301: an enterprise prints a tag, writes an EPC into the tag, and stores the EPC in a verification function. The EPC is used to identify an attached item.

S302: the verification function sends an inventory request to an AMF/a TMF via an NEF or a proxy, where the inventory request includes parameters such as an instruction type, a tag identifier, and a tag type. The verification function may be an AF or an AAA.

S303: the AMF/TMF determines an inventory base station in a plurality of base stations based on the parameters in the inventory request.

S304: the AMF/TMF sends an inventory command to a base station. The base station is the inventory base station determined in S303.

S305: the base station sends a select command to select a tag group for inventory and access.

S306 to S308: the base station and the tag perform a random access process, where the random access process is the same as S203 to S205 in the RFID service process in FIG. 2. For details, refer to S203 to S205. Details are not described herein again.

When the tag receives an ACK command sent by the base station, it indicates that random access succeeds.

S309: the tag that performs successful access sends a registration request to the base station.

The registration request includes the parameter EPC.

S310: the base station sends the registration request to the AMF/TMF.

The registration request includes the parameter EPC.

S311: the tag and the enterprise perform an authentication process via a 5GC.

S312: the AMF/TMF sends a registration response to the tag via the base station.

S313: the AMF/TMF sends an access command to the tag via the base station.

S314: the tag sends an access command response to the AMF/TMF.

S315: the AMF/TMF sends an inventory result of the tag to the verification function via the NEF or the proxy.

S316: the AMF/TMF sends indication information, where the indication information indicates the base station to inventory a next tag.

S317: repeat S305 to S316 to perform an inventory process of the next tag.

S318: the base station sends an inventory end command to the AMF/TMF.

S319: the AMF/TMF sends inventory results of tags to the verification function via the NEF or the proxy.

The foregoing network elements may perform some or all of the foregoing steps. For example, S312 to S317 are optional.

Because the reader is integrated into the base station, a communication distance between the tag and the reader becomes longer, and this may result in a communication security problem. For example, the tag is killed in an unauthorized way, information is written into the tag in an unauthorized way, reported data is eavesdropped, the reported data is tampered with, or the tag is forged to report data.

An existing RFID authentication manner primarily uses passwords. For example, before a kill operation, the tag verifies a kill password sent by the reader. After the verification passes, the tag performs the kill operation. Similarly, before the tag is switched to a secured state, the tag verifies an access password sent by the reader. After the verification passes, the tag is switched to the secured state.

Because a communication distance between an original reader and the tag is very short, no additional authentication process is needed. Therefore, there is no corresponding authentication process in a random access process of RFID. However, after the reader is integrated into the base station, the base station and the tag cannot authenticate each other. If a malicious base station sends an inventory command to obtain EPC information of the tag by using a random access command, tag information of valuables may be leaked. Alternatively, if a malicious tag responds to a random access command of the base station and uploads false data, an inventory result and data authenticity may be affected.

In existing RFID, in process of executing an access command, an authentication manner only supports authenticating the reader before a kill operation and an access operation. After the reader is integrated into the base station, a valid authentication process is also needed for commands such as Read and Write. In addition, after the reader is integrated into the base station, the original authentication manner may also be attacked. For example, if a malicious third party eavesdrops on communication between the base station and the tag, the malicious third party may obtain RN16 and a kill password or an access password obtained by performing an exclusive OR operation on a random number and the kill password or the access password. Therefore, the malicious third party can obtain the corresponding password and initiate a kill command or an access command to the tag, to maliciously read or modify the tag.

To resolve the foregoing technical problems, embodiments of this application provide the following solutions.

Figure 4A:
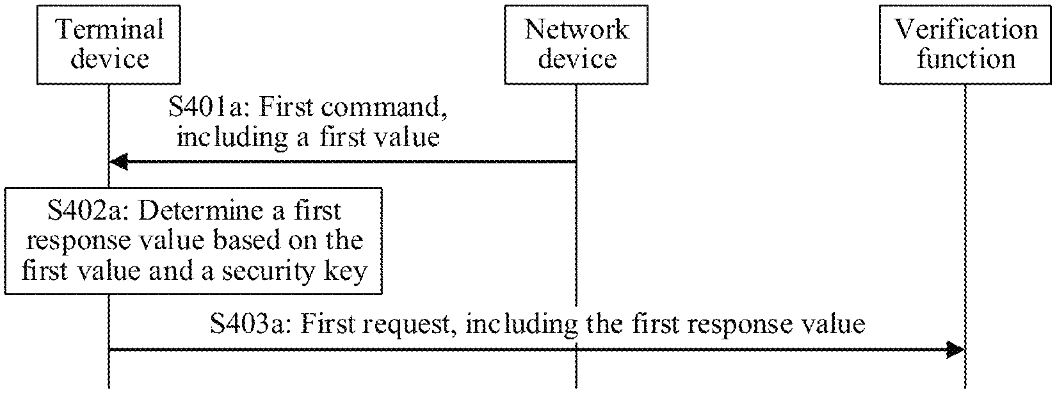
FIG. 4*a* is a schematic flowchart of a security verification method according to an embodiment of this application.

FIG. 4*a* is a schematic flowchart of a security verification method according to some embodiments of this application. Some embodiments of this application may include the following steps.

S401*a*: a terminal device receives a first command sent by a network device, where the first command includes a first value, and the first command is one of a select command, a query command, a query repeat command, a query adjust command, or an acknowledgment command.

The first value is generated by the network device. The network device may be a base station, a TMF/an AMF, or a verification function. The verification function may be an AF or an AAA.

The first value may be a random number RAND1 or a counter Count1.

The terminal device may be a tag, UE, or a chip in the UE.

S402*a*: the terminal device determines a first response value based on the first value and a security key.

The first response value RES1=MAC (K, RAND1); or the first response value RES1=MAC (K, Count1). K is the security key, and the security key may be written into the terminal device and the verification function in advance. MAC is any message authentication code algorithm.

The first response value may be calculated based on the first value and the security key in another manner. The first response value or another response value calculated in another manner falls within the protection scope of this application.

S403*a*: the terminal device sends a first request, where the first request includes the first response value, and the first response value is used by the verification function to verify the terminal device.

Optionally, the terminal device sends the first request to the verification function via the base station or the TMF/AMF.

After receiving the first request, the verification function determines a third value, and determines a fourth response value based on the third value and the security key. Both the third value and the first value are generated by the network device, and are initially a same random number or counter. However, after transmission, the first value and the third value may be tampered with. Therefore, the third value may be the same as the first value in the first command received by the terminal device, or may be different from the first value in the first command received by the terminal device. The fourth response value RES4=MAC (K, RAND1); or the fourth response value RES4=MAC (K, Count1). K is the security key. RAND1 and Count1 are third values. MAC is any message authentication code algorithm. Then, the verification function determines whether the first response value is the same as the fourth response value. When the first response value is the same as the fourth response value, it is determined that the terminal device passes verification, and it indicates that the terminal device is secure. When the first response value is different from the fourth response value, it is determined that the terminal device does not pass the verification, and it indicates that the terminal device has a security problem.

The first request may be an enterprise authentication request.

Figure 4B:
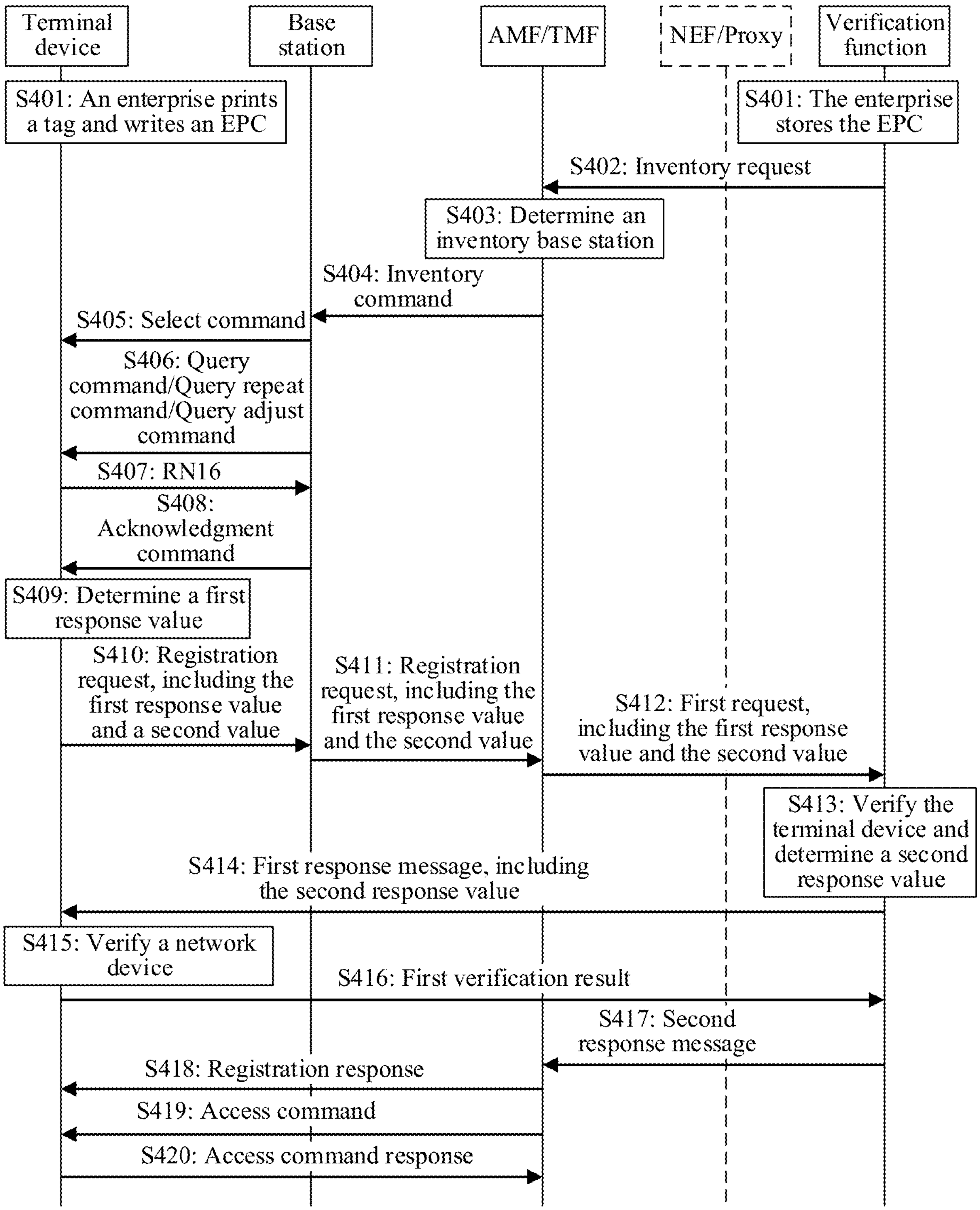
FIG. 4*b* is a schematic flowchart of another security verification method according to an embodiment of this application.

For an implementation of this embodiment, refer to the following embodiment shown in FIG. 4*b*. Details are not described herein again.

FIG. 4*b* is a schematic flowchart of a security verification method according to an embodiment of this application. Some embodiments of this application may include the following steps.

S401: an enterprise prints a tag, writes an EPC and a security key K into a terminal device, and stores the EPC and the security key K in a verification function.

The terminal device may be a tag, UE, or a chip in the UE. The verification function may be an AF or an AAA. The security key K in the terminal device is the same as the security key K in the verification function.

The EPC is used to identify the terminal device.

S402: the verification function sends an inventory request to a TMF/an AMF via an NEF or a proxy.

Optionally, the inventory request may include a first value. The first value may be generated by the verification function. The first value may be a random number RAND1 or a counter Count1. The counter Count1 is stored by the verification function, and the counter is increased by 1 each time Count1 is sent.

S403: the TMF/AMF determines an inventory base station based on the inventory request.

S404: the TMF/AMF sends an inventory command to a base station. The base station is the inventory base station determined in S403.

Optionally, the inventory command includes the first value, and the first value may be a random number RAND1 or a counter Count1.

The first value may be obtained by the TMF/AMF from the inventory request sent by the verification function, or may be locally generated by the TMF/AMF.

S405: the base station sends a select command to the terminal device to select one or more terminal devices for inventory and access.

Optionally, the select command includes the first value, and the first value may be a random number RAND1 or a counter Count1.

The first value may be obtained by the base station from the inventory command sent by the TMF/AMF, or may be locally generated by the base station.

The select command may include the following parameters:

Target, indicating whether to change an SL or an inventoried flag of the tag, where when the inventoried flag is changed, a session is specified;

Action, indicating whether tags that meet a condition declare SLs or not, or used to set inventoried flags of the tags to A or B;

MemBank, indicating whether a mask is used in the EPC, a tag identifier (TID), or a user zone;

Pointer and Length, indicating a storage range; and

Truncate, indicating whether a reply of the tag is truncated.

S406 to S408: the base station and the terminal device perform a random access process, where the random access process is the same as S203 to S205 in the RFID service process in FIG. 2. For details, refer to S203 to S205. Details are not described herein again.

When the terminal device receives an ACK command sent by the base station, it indicates that random access of the terminal device succeeds.

If the select command sent by the base station in S405 does not include the first value, the first value may be included in one of a query command, a query repeat command, a query adjust command, or an acknowledgment (ACK) command in the random access process.

The first value may be a random number RAND1 or a counter Count1.

The query command includes the following parameters: DR, used to set a T=>R (tag-to-reader) link frequency; M, used to set a T=>R data rate and a modulation format; TRext, used to choose whether to add a lead signal to a T=>R frame header; Sel, used to select tags to respond to a query; Session, used to select a session for an inventory periodicity; Target, used to select A or B as an inventoried flag of a tag participating in the inventory periodicity; and Q, used to set a quantity of slots in the inventory periodicity.

The query repeat command includes the following parameter: Session, used to confirm a session value of a current inventory periodicity.

The query adjust command includes the following parameters: Session, used to confirm a session value of a current inventory periodicity; and UpDn, used to determine whether the tag adjusts a Q value (for example, a quantity of slots in the inventory periodicity) and how the tag adjusts the Q value.

The acknowledgment (ACK) command includes the following parameter: RN16, which is a 16-bit random number or pseudo random number.

S409: the terminal device determines a first response value based on the first value and the security key.

The first response value RES1=MAC (K, RAND1); or the first response value RES1=MAC (K, Count1). K is the security key. MAC is any message authentication code algorithm.

The first response value may be calculated based on the first value and the security key in another manner. The first response value or another response value calculated in another manner falls within the protection scope of this application.

S410: the terminal device sends a registration request to the base station.

The registration request may include the first response value RES1. Optionally, the registration request may include the EPC.

Optionally, the registration request may further include a second value, and the second value is a random number RAND2 or a counter Count2 generated by the terminal device. The terminal device may generate the counter Count2 in one of the following two manners.

In a first manner, the terminal device adds 1 to Count1 to generate Count2.

In a second manner, the terminal device locally stores Count2, and locally stored Count2 is increased by 1 each time Count2 is sent.

S411: the base station sends the registration request to the AMF/TMF.

The registration request includes the first response value RES1.

Optionally, the registration request may further include the second value. Optionally, the registration request may further include the EPC.

S412: the TMF/AMF sends a first request to the verification function.

Optionally, the terminal device sends the first request to the verification function via the TMF/AMF (or the NEF/proxy).

The first request includes the first response value RES1. Optionally, the first request may further include the second value. Optionally, the first request may further include the EPC.

The first request may be an enterprise authentication request.

Optionally, the TMF/AMF may send the first request to a UDM/an AUSF. The first request includes the first response value RES1.

Optionally, the first request may further include the second value. Optionally, the first request may further include the EPC.

After receiving the first request, the UDM/AUSF verifies the terminal device. In other words, a verification process may be completed via the UDM/AUSF. In this case, an interaction process between the AF/AAA and the TMF/AMF in FIG. **4*b*** may be changed to an interaction process between the UDM/AUSF and the TMF/AMF. The UDM/AUSF pre-configures the EPC, the security key K, and the counter Count1 of the terminal device (where configuration and maintenance of the counter Count1 are optional).

S413: the verification function verifies the terminal device based on the first response value.

For example, after receiving the first request, the verification function determines a third value, and determines a fourth response value based on the third value and the security key. Both the third value and the first value are generated by the network device, and are initially a same random number or counter. However, after transmission, the first value and the third value may be tampered with. Therefore, the third value may be the same as the first value in the first command received by the terminal device, or may be different from the first value in the first command received by the terminal device. The fourth response value RES4=MAC (K, RAND1); or the fourth response value RES4=MAC (K, Count1). K is the security key. RAND1 and Count1 are third values. MAC is any message authentication code algorithm. Then, the verification function determines whether the first response value is the same as the fourth response value. When the first response value is the same as the fourth response value, it is determined that the terminal device passes the verification, and it indicates that the terminal device is secure. When the first response value is different from the fourth response value, it is determined that the terminal device does not pass the verification, and it indicates that the terminal device has a security problem.

The third value may be generated by the verification function. If the third value is not generated by the verification function (for example, the third value is generated by the TMF/AMF or the base station), the third value may be sent by the terminal device to the verification function.

Optionally, when the verification function determines that the terminal device passes the verification, the verification function may determine a second response value based on the second value in the received first request and the security key. The second response value RES2=MAC (K, RAND2); or the second response value RES2=MAC (K, Count2).

Because there is a communication distance between the terminal device and the network device, data may be tampered with in a transmission process. The second value in the first request received by the verification function may be the same as or different from the second value in the registration request sent by the terminal device.

The second value is a random number RAND2 or a counter Count2 generated by the terminal device. If the counter Count2 in S410 is generated by adding 1 to Count1, the verification function adds 1 to locally maintained Count1.

Optionally, the verification function may generate and determine a derived key Ktmf based on the security key, the electronic product code EPC, and at least one of the first value or the second value. The derived key Ktmf may be used for signaling encryption or integrity protection.

S414: the verification function sends a first response message.

Optionally, the verification function may send the first response message to the terminal device via the TMF/AMF or the base station.

The first response message includes the second response value. Optionally, the first response message may further include the EPC.

The first response message may be a tag authentication response.

S415: the terminal device verifies the network device based on the second response value.

For example, the terminal device may determine a third response value based on the second value and the security key. The second value is a random number RAND2 or a counter Count2 generated by the terminal device, and is the same as the second value in the registration request sent by the terminal device in S410. The third response value RES3=MAC (K, RAND2); or the third response value RES3=MAC (K, Count2). Then, it is determined whether the second response value is the same as the third response value. When the second response value is the same as the third response value, it is determined that the network device passes the verification, and it indicates that the network device is secure. When the second response value is different from the third response value, it is determined that the network device does not pass the verification, and it indicates that the network device has a communication security problem.

The network device may be a base station, a TMF/an AMF, a verification function, or the like.

S416: the terminal device sends a first verification result to the verification function via the AMF entity or the TMF entity.

The first verification result is a verification result of the network device. The first verification result includes that the network device passes the verification or the network device does not pass the verification.

The first verification result is a tag authentication result.

S417: the verification function sends a second response message to the AMF entity or the TMF entity.

The second response message may include a second verification result, and the second verification result is a verification result of the terminal device. The second verification result includes that the terminal device passes the verification or the terminal device does not pass the verification.

Optionally, the second response message includes a derived key. The derived key is generated based on the security key, the electronic product code EPC, and at least one of the first value or the second value, and the EPC is used to identify the terminal device.

If the derived key is not generated after the verification function verifies the terminal device in S413, the derived key may be generated in this step.

Optionally, if determining that the terminal device passes the verification, and/or determining that the network device passes the verification, the verification function may send the second response message to the AMF entity or the TMF entity.

The second response message may be an enterprise authentication response.

S418: the AMF/TMF sends a registration response to the terminal device via the base station.

S419: the AMF/TMF sends an access command to the terminal device via the base station.

The access command may include: Req_RN: requesting new RN16; Read: reading data; Write: writing data; Kill: killing the tag (where a kill password is needed); Lock: a lock operation (where a locked area cannot be read/written); Access: switching the tag to a secured state, in other words, performing the lock operation (where an access password is needed); BlockWrite: a multi-word write operation; and BlockErase: a multi-word erase operation.

S420: the terminal device sends an access command response to the AMF/TMF.

In this embodiment of this application, the terminal device determines the first response value based on the first value included in the received first command (for example, the select command, the query command, the query repeat command, the query adjust command, or the acknowledgment command) of the network device, and sends the first response value to the verification function, so that the verification function verifies the terminal device. In addition, the verification function determines the second response value based on the second value generated by the terminal device, and sends the second response value to the terminal device, so that the terminal device verifies the network device. Bidirectional verification between the terminal device and the network device is implemented. Therefore, communication security between the terminal device and the network device is ensured. Because the first value generated by the network device is sent to the terminal device by using the first command to calculate the first response value, a quantity of interactions between the terminal device and the network device can be reduced, thereby reducing signaling overheads.

In the embodiment shown in FIG. **4*b*, the terminal device is first verified, and then the network device is verified. In the following embodiment shown in FIG. 5**, the network device is first verified, and then the terminal device is verified. In addition, the terminal device in this embodiment may initiate a verification process according to a locally configured security policy.

Figure 5:
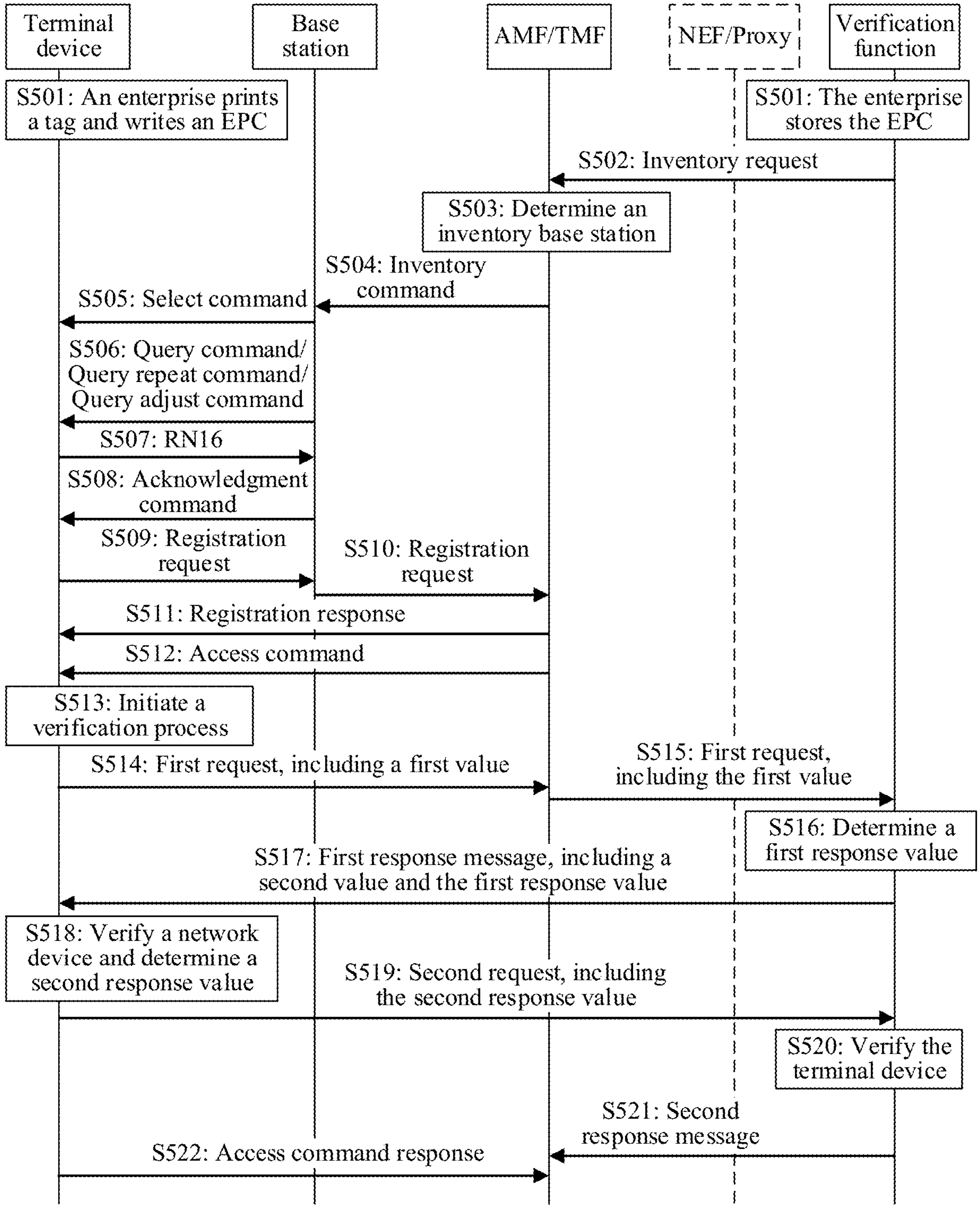
FIG. 5 is a schematic flowchart of another security verification method according to an embodiment of this application.

FIG. 5 is a schematic flowchart of a security verification method according to an embodiment of this application. Some embodiments of this application may include the following steps.

S501: an enterprise prints a tag, writes an EPC, a security key K, and a security policy into a terminal device, and stores the EPC and the security key K in a verification function.

The terminal device may be a tag, UE, or a chip in the UE. The verification function may be an AF or an AAA. The security key K in the terminal device is the same as the security key K in the verification function.

The EPC is used to identify the terminal device.

The security policy indicates an execution condition of bidirectional verification. In other words, when determining that the execution condition is met, the terminal device initiates a verification process.

S502: the verification function sends an inventory request to an AMF/a TMF via an NEF or a proxy, where the inventory request includes parameters such as an instruction type, a tag identifier, and a tag type.

S503: the AMF/TMF determines an inventory base station in a plurality of base stations based on the parameters in the inventory request.

S504: the AMF/TMF sends an inventory command to a base station. The base station is the inventory base station determined in S503.

S505: the base station sends a select command to select one or more terminal devices for inventory and access.

S506 to S508: the base station and the terminal device perform a random access process, where the random access process is the same as S203 to S205 in the RFID service process in FIG. 2. For details, refer to S203 to S205. Details are not described herein again.

When the terminal device receives an ACK command sent by the base station, it indicates that random access of the terminal device succeeds.

S509: the terminal device sends a registration request to the base station.

The registration request includes the parameter EPC.

S510: the base station sends the registration request to the AMF/TMF.

The registration request includes the parameter EPC.

S511: the AMF/TMF sends a registration response to the terminal device via the base station.

S512: the AMF/TMF sends an access command to the terminal device via the base station.

The access command may include: Req_RN: requesting new RN16; Read: reading data; Write: writing data; Kill: killing the tag (where a kill password is needed); Lock: a lock operation (where a locked area cannot be read/written); Access: switching the tag to a secured state, in other words, performing the lock operation (where an access password is needed); BlockWrite: a multi-word write operation; and BlockErase: a multi-word erase operation.

S513: the terminal device initiates the verification process according to a locally configured security policy.

Optionally, after receiving the access command, the terminal device initiates the verification process based on the access command.

S514: the terminal device sends a first request to the TMF/AMF.

The first request may include a first value. Optionally, the first request may further include the EPC.

The first value may be a random number RAND1 or a counter Count1 generated by the terminal device. When the terminal device locally maintains the counter Count1, locally maintained Count1 is increased by 1 each time the terminal device sends the counter Count1.

The first request may be an authentication request response.

S515: the AMF/TMF sends the first request to the verification function via the NEF or the proxy.

The first request may include the first value. Optionally, the first request may further include the EPC. The first value may include a random number RAND1 or a counter Count1 generated by the terminal device.

The first request may be an enterprise authentication request.

Optionally, the TMF/AMF may send a first request to a UDM/an AUSF. The first request includes the first value. Optionally, the first request may further include the EPC. In this case, an interaction process between the AF/AAA and the TMF/AMF in FIG. 5 may be changed to an interaction process between the UDM/AUSF and the TMF/AMF. The UDM/AUSF pre-configures the EPC, the security key K, and the counter Count2 of the terminal device (where configuration and maintenance of the counter Count2 are optional). In other words, the verification process is completed via the UDM/AUSF.

S516: the verification function determines a first response value based on the first value in the received first request and the security key.

The first response value RES1=MAC (K, RAND1); or the first response value RES1=MAC (K, Count1). K is the security key. RAND1 is the first value. MAC is any message authentication code algorithm.

Because there is a communication distance between the terminal device and a network device, data may be tampered with in a transmission process. The first value in the first request received by the verification function may be the same as or different from the first value in the first request sent by the terminal device.

The first response value may be calculated based on the first value and the security key in another manner. The first response value or another response value calculated in another manner falls within the protection scope of this application.

S517: the verification function sends a first response message to the terminal device.

The first response message includes the first response value.

Optionally, the first response message includes a second value. The second value may be a random number RAND2 or a counter Count2 generated by the network device (for example, the base station, the TMF/AMF, or the verification function). When the verification function locally maintains the counter Count2, locally maintained Count2 is increased by 1 each time the verification function sends the counter Count2.

If the second value is not generated by the verification function, for example, the second value is generated by the TMF/AMF or the base station, the verification function may alternatively obtain the second value from the TMF/AMF or the base station.

Optionally, the first response message may further include the EPC.

The first response message may be a tag authentication response.

S518: the terminal device verifies the network device based on the first response value.

For example, the terminal device may determine a third response value based on the first value and the security key. The first value is a random number RAND1 or a counter Count1 generated by the terminal device, and is the same as the first value in the first request sent by the terminal device in S514. The third response value RES3-MAC (K, RAND1); or the third response value RES3=MAC (K, Count1). Then, it is determined whether the first response value is the same as the third response value. When the first response value is the same as the third response value, it is determined that the network device passes the verification, and it indicates that the network device is secure. When the first response value is different from the third response value, it is determined that the network device does not pass the verification, and it indicates that the network device has a communication security problem.

Optionally, when the terminal device determines that the network device passes the verification, the terminal device may determine a second response value based on a second value in the received first response message and the security key. The second value is a random number RAND2 or a counter Count2 generated by the network device. The second response value RES2=MAC (K, RAND2); or the second response value RES2=MAC (K, Count2).

Because there is a communication distance between the terminal device and the network device, data may be tampered with in a transmission process. The second value in the first response message received by the terminal device may be the same as or different from the second value in the first response message sent by the verification function.

S519: the terminal device sends a second request to the verification function.

Optionally, the terminal device sends the second request to the verification function via the TMF/AMF (or via the NEF or the proxy).

The second request may include the second response value. Optionally, the second request may further include the EPC.

The second request may be a tag authentication request.

S520: the verification function verifies the terminal device based on the second response value.

For example, the verification function determines a fourth response value based on the second value and the security key. The second value may be a random number RAND2 or a counter Count2, and is the same as the second value in the first response message sent by the verification function in S517. The fourth response value RES4=MAC (K, RAND2); or the fourth response value RES4=MAC (K, Count2). K is the security key. MAC is any message authentication code algorithm. Then, the verification function determines whether the second response value is the same as the fourth response value. When the second response value is the same as the fourth response value, it is determined that the terminal device passes the verification, and it indicates that the terminal device is secure. When the second response value is different from the fourth response value, it is determined that the terminal device does not pass the verification, and it indicates that the terminal device has a security problem.

Optionally, the verification function may generate and determine a derived key Ktmf based on the security key, the electronic product code EPC, and at least one of the first value or the second value. The derived key Ktmf may be used for signaling encryption and/or integrity protection.

S521: the verification function sends a second response message to the TMF/AMF via the NEF or the proxy.

The second response message may include a verification result. The verification result includes that the terminal device passes the verification or the terminal device does not pass the verification.

Optionally, when the verification function determines that the terminal device passes the verification, the verification function may send the second response message to the AMF entity or the TMF entity. The second response message may include the derived key Ktmf.

The second response message may be an enterprise authentication response.

S522: the terminal device sends an access command response to the TMF/AMF via the base station.

In this embodiment of this application, after receiving the access command, the terminal device initiates the verification process according to the security policy. The verification function determines the first response value based on the first value generated by the terminal device, and sends the first response value to the terminal device, so that the terminal device verifies the network device. In addition, the terminal device determines the second response value based on the second value generated by the network device, and sends the second response value to the network device, so that the network device verifies the terminal device. Bidirectional verification between the terminal device and the network device is implemented. Therefore, communication security between the terminal device and the network device is ensured.

In the foregoing embodiment, bidirectional verification between the terminal device and the network device is implemented. In the following embodiment shown in FIG. 6, unidirectional verification is merely performed on the network device. In addition, the terminal device in this embodiment may determine, based on the access command, whether to perform unidirectional verification on the network device.

Figure 6:
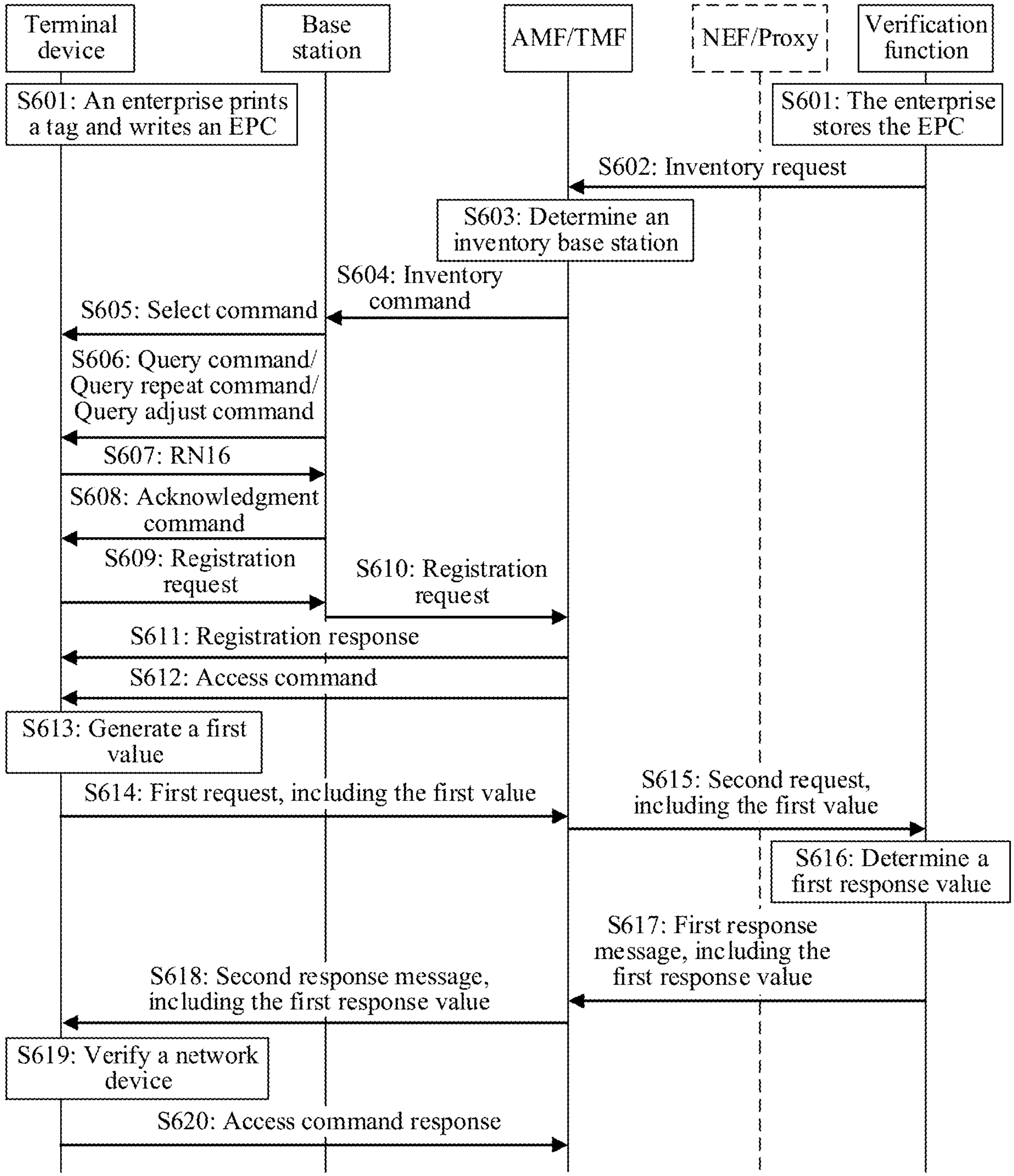
FIG. 6 is a schematic flowchart of another security verification method according to an embodiment of this application.

FIG. 6 is a schematic flowchart of a security verification method according to an embodiment of this application. Some embodiments of this application may include the following steps.

S601: an enterprise prints a tag, writes an EPC and a security key K into a terminal device, and stores the EPC and the security key K in a verification function.

The terminal device may be a tag, UE, or a chip in the UE. The verification function may be an AF or an AAA. The security key K in the terminal device is the same as the security key K in the verification function.

The EPC is used to identify the terminal device.

S602 to S612 are the same as S502 to S512 in FIG. 5. For an implementation, refer to S502 to S512 in FIG. 5. Details are not described herein again.

S613: the terminal device generates a first value.

Optionally, the terminal device may determine, based on an access command, whether to perform unidirectional verification on a network device. After determining to perform unidirectional verification on the network device, the terminal device generates the first value.

Further, manners in which the terminal device determines whether to perform unidirectional verification on the network device include the following.

In a first manner, the terminal device starts to perform unidirectional verification on the network device provided that the terminal device receives the access command.

In a second manner, the terminal device starts to perform unidirectional verification on the network device only after receiving a specified access command. The specified access command may include commands such as Write, Kill, and Lock.

The foregoing determining manners may be written into the terminal device when the tag is printed.

The first value may be a random number RAND or a counter Count generated by the terminal device. When the terminal device locally maintains the counter Count, locally maintained Count is increased by 1 each time the terminal device sends the counter Count.

S614: the terminal device sends a first request to a TMF/an AMF.

The first request may include the first value.

Optionally, the first request may include the EPC, and the EPC is used to identify the terminal device.

The first request may be an authentication request.

S615: the TMF/AMF sends a second request to the verification function via an NEF or a proxy.

The second request may include a first value. Optionally, the second request may further include the EPC.

The second request may be an enterprise authentication request.

Optionally, the TMF/AMF may send the second request to a UDM/an AUSF. The second request includes the first value. Optionally, the second request may further include the EPC. In this case, an interaction process between the AF/AAA and the TMF/AMF in FIG. 6 may be changed to an interaction process between the UDM/AUSF and the TMF/AMF. The UDM/AUSF pre-configures the EPC, the security key K, and the counter Count of the terminal device (where configuration and maintenance of the counter Count are optional). In other words, the verification process is completed via the UDM/AUSF.

S616: the verification function determines a first response value based on the first value in the received second request and the security key.

The first value is a random number RAND or a counter Count generated by the terminal device. The first response value RES1=MAC (K, RAND); or the first response value RES1=MAC (K, Count). K is the security key. MAC is any message authentication code algorithm.

Because there is a communication distance between the terminal device and the network device, data may be tampered with in a transmission process. The first value in the second request received by the verification function may be the same as or different from the first value in the first request sent by the terminal device.

The first response value may be calculated based on the first value and the security key in another manner. The first response value or another response value calculated in another manner falls within the protection scope of this application.

Optionally, the verification function may generate and determine a derived key Ktmf based on the first value, the security key, and the electronic product code EPC. The derived key Ktmf may be used for signaling encryption and/or integrity protection.

S617: the verification function sends a first response message to the AMF/TMF via the NEF or the proxy.

The first response message may include the first response value.

Optionally, the first response message may include the derived key Ktmf. After receiving the derived key Ktmf, the AMF/TMF may perform signaling encryption or integrity protection by using the derived key Ktmf.

Optionally, the first response message may include the EPC.

S618: the AMF/TMF sends a second response message to the terminal device.

The second response message may include the first response value.

Optionally, the second response message may include the EPC.

S619: the terminal device verifies the network device based on the first response value.

For example, the terminal device may determine a second response value based on the first value and the security key. The first value is a random number RAND or a counter Count generated by the terminal device, and is the same as the first value in the first request sent by the terminal device in S614. The second response value RES2-MAC (K, RAND); or the second response value RES2=MAC (K, Count). Then, it is determined whether the first response value is the same as the second response value. When the first response value is the same as the second response value, it is determined that the network device passes the verification, and it indicates that the network device is secure. When the first response value is different from the second response value, it is determined that the network device does not pass the verification, and that the network device does not pass the verification indicates that the network device has a communication security problem.

The network device may be a base station, a TMF/an AMF, a verification function, or the like.

S620: the terminal device sends an access command response to the TMF/AMF via the base station.

For example, when it is determined that the network device passes the verification, the terminal device may return the access command response to the TMF/AMF. When it is determined that the network device does not pass the verification, the terminal device may return a reject message or may not return the access command response to the TMF/AMF.

In this embodiment of this application, after receiving the access command, the terminal device initiates the verification on the network device, and executes the access command after the network device passes the verification, to avoid a case in which a malicious base station initiates a command such as a read command, a write command, or a kill command to the terminal device. Therefore, communication security between the terminal device and the network device is ensured.

Figure 7:
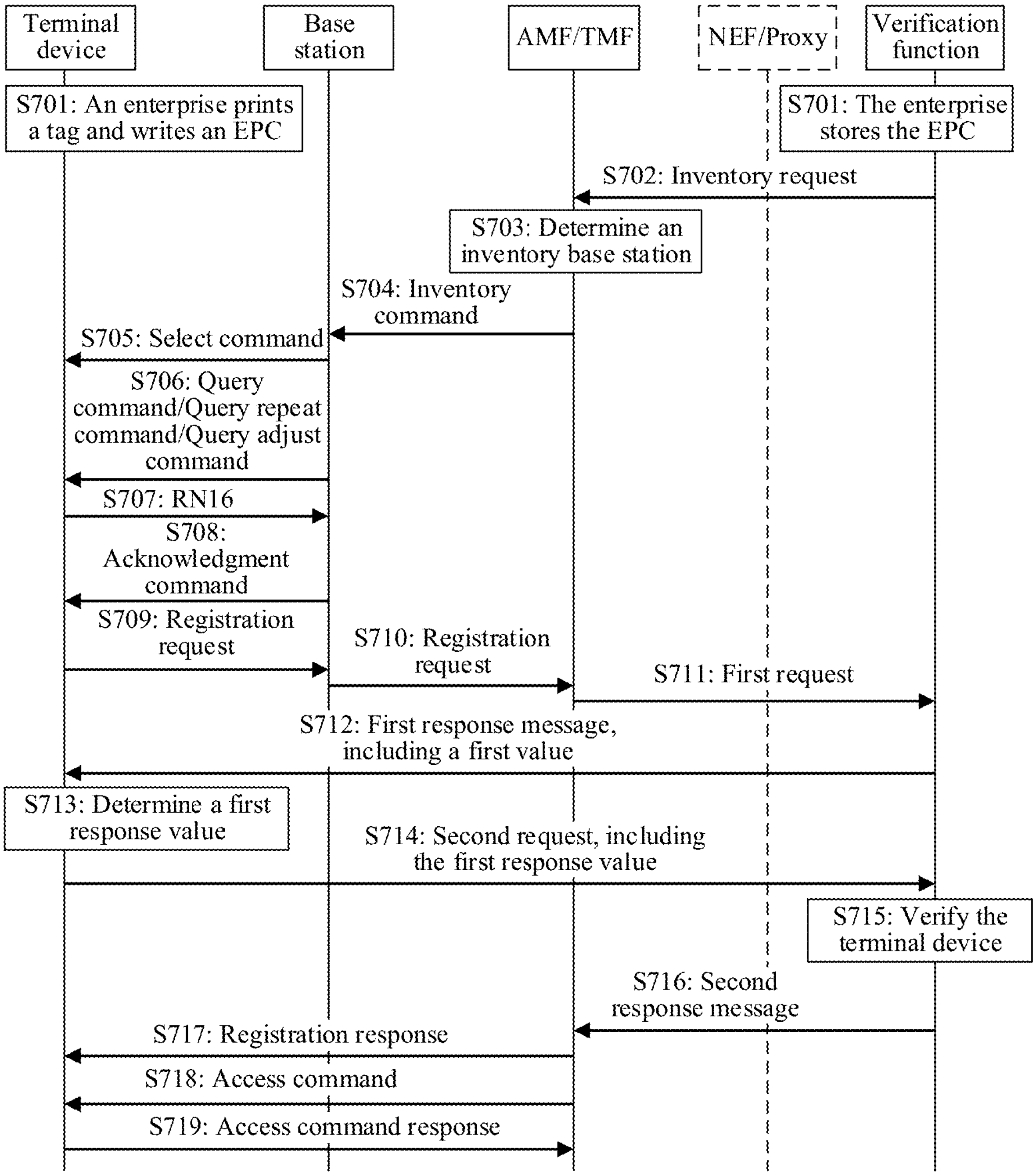
FIG. 7 is a schematic flowchart of another security verification method according to an embodiment of this application.

In the embodiment shown in FIG. 6, unidirectional verification is merely performed on the network device, and in an embodiment shown in FIG. 7, unidirectional verification is merely performed on the terminal device. In addition, in this embodiment, a process of verifying the terminal device is initiated after the terminal device sends a registration request.

FIG. 7 is a schematic flowchart of a security verification method according to an embodiment of this application. Some embodiments of this application may include the following steps.

S701: an enterprise prints a tag, writes an EPC and a security key K into a terminal device, and stores the EPC and the security key K in a verification function.

The terminal device may be a tag, UE, or a chip in the UE. The verification function may be an AF or an AAA. The security key K in the terminal device is the same as the security key K in the verification function.

The EPC is used to identify the terminal device.

S702 to S710 are the same as S502 to S510 in FIG. 5. For an implementation, refer to S502 to S510 in FIG. 5. Details are not described herein again.

S711: an AMF/a TMF sends a first request to the verification function.

The first request may include the EPC.

The first request may be an enterprise authentication request.

S712: the verification function sends a first response message to the terminal device.

Optionally, the verification function sends the first response message to the terminal device via the TMF/AMF (or via an NEF or a proxy).

The first response message includes a first value. The first value is a random number RAND or a counter Count generated by a network device (for example, a base station, the TMF/AMF, or the verification function). When the verification function locally maintains the counter Count, locally maintained Count is increased by 1 each time the verification function sends the counter Count.

If the first value is not generated by the verification function, for example, the first value is generated by the TMF/AMF or the base station, the verification function may alternatively obtain the first value from the TMF/AMF or the base station.

Optionally, the first response message may include the EPC.

The first response message may be a tag authentication response.

S713: the terminal device determines a first response value based on a first value in the received first response message and the security key.

The first value is a random number RAND or a counter Count generated by the network device. The first response value RES1=MAC (K, RAND); or the first response value RES1=MAC (K, Count). K is the security key. MAC is any message authentication code algorithm.

Because there is a communication distance between the terminal device and the network device, data may be tampered with in a transmission process. The first value in the first response message received by the terminal device may be the same as or different from the first value in the first response message sent by the verification function.

The first response value may be calculated based on the first value and the security key in another manner. The first response value or another response value calculated in another manner falls within the protection scope of this application.

S714: the terminal device sends a second request to the verification function.

Optionally, the terminal device sends the second request to the AF/AAA via the TMF/AMF (or via the NEF or the proxy).

The second request may include the first response value.

Optionally, the second request may include the EPC.

The second request may be a tag authentication request.

S715: the verification function verifies the terminal device based on the first response value.

For example, the verification function may determine a second response value based on the first value and the security key. The first value is a random number RAND or a counter Count generated by the network device, and is the same as the first value in the first response message sent by the verification function in S712. The second response value RES2=MAC (K, RAND); or the second response value RES2=MAC (K, Count). Then, it is determined whether the first response value is the same as the second response value. When the first response value is the same as the second response value, it is determined that the terminal device passes the verification, and it indicates that the terminal device is secure. When the first response value is different from the second response value, it is determined that the terminal device does not pass the verification, and that the terminal device does not pass the verification indicates that the terminal device has a communication security problem.

Optionally, the verification function may generate and determine a derived key Ktmf based on the first value, the security key, and the electronic product code EPC. The derived key Ktmf may be used for signaling encryption and/or integrity protection.

S716: the verification function sends a second response message to the TMF/AMF.

Optionally, the verification function sends the second response message to the TMF/AMF via the NEF or the proxy.

The second response message includes a verification result. The verification result includes that the terminal device passes the verification or the terminal device does not pass the verification.

Optionally, when determining that the terminal device passes the verification, the verification function sends the second response message to the TMF/AMF, where the second response message includes the derived key Ktmf. After receiving the derived key Ktmf, the AMF/TMF may perform signaling encryption or integrity protection by using the derived key Ktmf.

The second response message may be an enterprise authentication response.

S717: the AMF/TMF sends a registration response to the terminal device via the base station.

S718: the AMF/TMF sends an access command to the terminal device via the base station.

S719: the terminal device sends an access command response to the AMF/TMF.

In this embodiment of this application, after the terminal device sends the registration request, the network device performs unidirectional verification on the terminal device, to ensure authenticity of the EPC and subsequent data uploaded by the terminal device, and avoid a case in which a false terminal device uploads a false EPC and false data. Therefore, communication security between the terminal device and the network device is ensured.

In the foregoing embodiments, the terminal device, the base station, the TMF/AMF, and/or the verification function may perform some or all of the steps in the embodiments. For example, S418 to S420 in the embodiment shown in FIG. 4*b* are optional. These steps or operations are merely examples. Other operations or variants of various operations may be further performed in embodiments of this application. In addition, the steps may be performed in a sequence different from a sequence presented in embodiments, and not all the operations in embodiments of this application may be necessarily performed. In addition, sequence numbers of the steps do not mean an execution sequence. An execution sequence of the processes should be determined based on functions and internal logic of the processes, and should not constitute any limitation on the implementation processes of embodiments of this application.

In the foregoing embodiments, the verification function may be the AF or the AAA, or the verification function may be the UDM.

It may be understood that in the foregoing method embodiments, methods and operations implemented by the terminal device may alternatively be implemented by a component (for example, a chip or a circuit) that may be used in the terminal device, and methods and operations implemented by the verification function may alternatively be implemented by a component (for example, a chip or a circuit) that may be used in the verification function.

The foregoing describes the solutions provided in embodiments of this application from a perspective of interaction between the devices. It may be understood that, to implement the foregoing functions, each network element, for example, a transmitting end device or a receiving end device, includes a corresponding hardware structure and/or software module for performing each function. A person skilled in the art should be able to be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the terminal device or the verification function may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. In embodiments of this application, module division is an example, and is merely logical function division. During actual implementation, another division manner may be used. Descriptions are provided below by using an example in which each functional module is obtained through division corresponding to each function.

The foregoing describes in detail the method provided in embodiments of this application with reference to FIG. 4*a* to FIG. 7. The following describes in detail a security verification apparatus provided in embodiments of this application with reference to FIG. 8 to FIG. 9. Descriptions of apparatus embodiments correspond to the descriptions of the method embodiments. Therefore, for content that is not described in detail, refer to the method embodiments above. For brevity, details are not described herein again.

Figure 8:
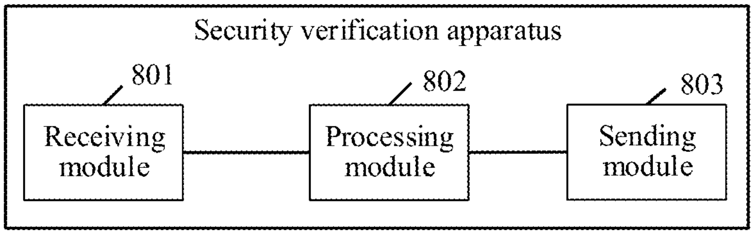
FIG. 8 is a diagram of a structure of a security verification apparatus according to an embodiment of this application.

FIG. 8 is a diagram of a structure of a security verification apparatus according to an embodiment of this application. The security verification apparatus may include a receiving module 801, a processing module 802, and a sending module 803. The receiving module 801 and the sending module 803 may communicate with the outside. The processing module 802 is configured to perform processing, for example, determine a first response value. The receiving module 801 and the sending module 803 may also be referred to as a communication interface, a transceiver unit, or a transceiver module. The receiving module 801, the processing module 802, and the sending module 803 may be configured to perform actions performed by the terminal device in the foregoing method embodiments.

For example, the receiving module 801 and the sending module 803 may also be referred to as a transceiver module or a transceiver unit (including a receiving unit and/or a sending unit), and are respectively configured to perform receiving and sending steps of the terminal device in the foregoing method embodiments.

In a possible design, the security verification apparatus may implement steps or procedures performed by the terminal device corresponding to the foregoing method embodiments. For example, the security verification apparatus may be a terminal device, or a chip or a circuit configured in the terminal device. The receiving module 801 and the sending module 803 are configured to perform receiving and sending related operations of the terminal device in the foregoing method embodiments. The processing module 802 is configured to perform processing related operations of the terminal device in the foregoing method embodiments.

For example, the receiving module 801 is configured to receive a first command sent by a network device, where the first command includes a first value, and the first command is one of a select command, a query command, a query repeat command, a query adjust command, or an acknowledgment command.

The processing module 802 is configured to determine a first response value based on the first value and a security key.

The sending module 803 is configured to send a first request, where the first request includes the first response value, and the first response value is used by a verification function to verify the terminal device.

For implementation of each module, further refer to the corresponding descriptions in the method embodiments shown in FIG. 4*a* to FIG. 7. The method and the functions performed by the terminal device in the foregoing embodiments are performed.

Figure 9:
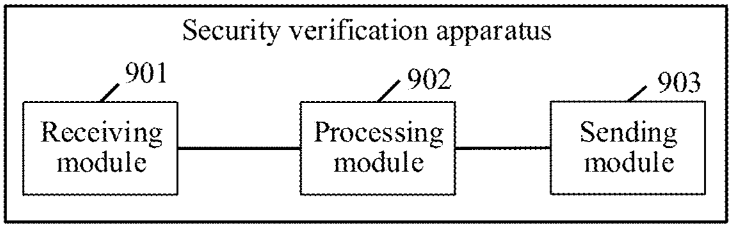
FIG. 9 is a diagram of a structure of another security verification apparatus according to an embodiment of this application.

FIG. 9 is a diagram of a structure of a security verification apparatus according to an embodiment of this application. The security verification apparatus may include a receiving module 901, a processing module 902, and a sending module 903. The receiving module 901 and the sending module 903 may communicate with the outside. The receiving module 901 and the sending module 903 may also be referred to as a communication interface, a transceiver unit, or a transceiver module. The processing module 902 is configured to perform processing, for example, verify a terminal device. The receiving module 901, the processing module 902, and the sending module 903 may be configured to perform actions performed by the verification function in the foregoing method embodiments.

For example, the receiving module 901 and the sending module 903 may also be referred to as a transceiver module or a transceiver unit (including a receiving unit and/or a sending unit), and are respectively configured to perform receiving and sending steps of the verification function in the foregoing method embodiments.

In a possible design, the security verification apparatus may implement steps or procedures performed by the verification function corresponding to the foregoing method embodiments. For example, the security verification apparatus may be a verification function, or a chip or a circuit configured in the verification function. The receiving module 901 and the sending module 903 are configured to perform receiving and sending related operations of the verification function in the foregoing method embodiments. The processing module 902 is configured to perform processing related operations of the verification function in the foregoing method embodiments.

For example, the receiving module 901 is configured to receive a first request, where the first request includes a first response value, the first response value is determined based on a security key and a first value included in a first command of a network device, and the first command is one of a select command, a query command, a query repeat command, a query adjust command, or an acknowledgment command.

The processing module 902 is configured to verify the terminal device based on the first response value.

For implementation of each module, further refer to the corresponding descriptions in the method embodiments shown in FIG. 4*a* to FIG. 7. The method and the functions performed by the verification function in the foregoing embodiments are performed.

Figure 10:
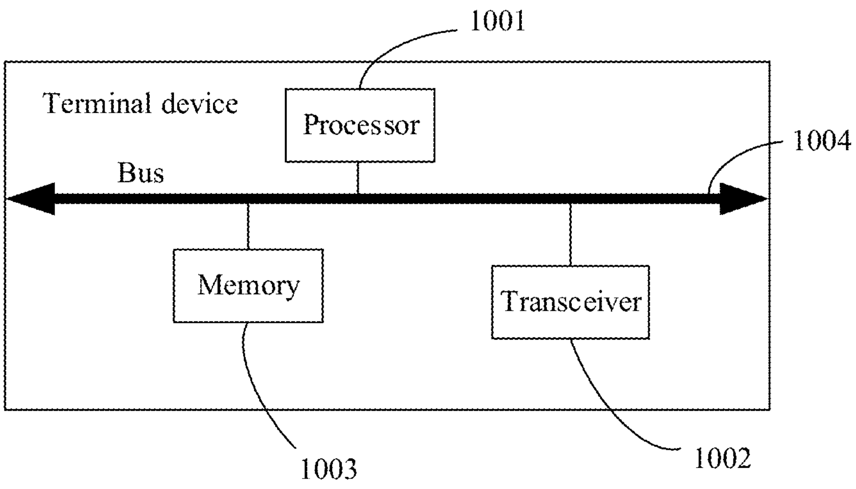
FIG. 10 is a diagram of a structure of a terminal device according to an embodiment of this application.

FIG. 10 is a diagram of a structure of a terminal device according to an embodiment of this application. The terminal device may be used in the system shown in FIG. 1, to perform functions of the terminal device in the foregoing method embodiments, or implement steps or procedures performed by the terminal device in the foregoing method embodiments.

As shown in FIG. 10, the terminal device includes a processor 1001 and a transceiver 1002. Optionally, the terminal device further includes a memory 1003. The processor 1001, the transceiver 1002, and the memory 1003 may communicate with each other through an internal connection path, to transfer a control signal and/or a data signal. The memory 1003 is configured to store a computer program. The processor 1001 is configured to: invoke the computer program from the memory 1003 and run the computer program, to control the transceiver 1002 to receive or send a signal. Optionally, the terminal device may further include an antenna, configured to send, by using a radio signal, uplink data or uplink control signaling output by the transceiver 1002.

The foregoing processor 1001 may correspond to the processing module in FIG. 8. The foregoing processor 1001 and the memory 1003 may be combined into a processing apparatus. The processor 1001 is configured to execute program code stored in the memory 1003 to implement the foregoing functions. In some embodiments, the memory 1003 may alternatively be integrated into the processor 1001, or may be independent of the processor 1001.

The foregoing transceiver 1002 may correspond to the receiving module and the sending module in FIG. 8, and may also be referred to as a transceiver unit or a transceiver module. The transceiver 1002 may include a receiver (or referred to as a receiver machine or a receiver circuit) and a transmitter (or referred to as a transmitter machine or a transmitter circuit). The receiver is configured to receive a signal, and the transmitter is configured to transmit a signal.

The terminal device shown in FIG. 10 can implement processes related to the terminal device in the method embodiments shown in FIG. 4*a* to FIG. 7. Operations and/or functions of modules in the terminal device are respectively intended to implement corresponding procedures in the foregoing method embodiments. For details, refer to the descriptions in the foregoing method embodiments. To avoid repetition, detailed descriptions are properly omitted herein.

The foregoing processor 1001 may be configured to perform actions that are internally implemented by the terminal device and that are described in the foregoing method embodiments. The transceiver 1002 may be configured to perform actions that are sent by the terminal device to the verification function or received by the terminal device from the verification function and that are described in the foregoing method embodiments. For details, refer to the descriptions in the foregoing method embodiments. Details are not described herein again.

The processor 1001 may be a central processing unit, a general-purpose processor, a digital signal processor, an application-specific integrated circuit, a field programmable gate array or another programmable logic device, a transistor logic device, a hardware component, or any combination thereof. The processor 1001 may implement or execute various example logical blocks, modules, and circuits described with reference to content disclosed in this application. Alternatively, the processor 1001 may be a combination of processors implementing a computing function, for example, a combination of one or more microprocessors, or a combination of a digital signal processor and a microprocessor. A communication bus 1004 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 10, but this does not mean that there is only one bus or only one type of bus. The communication bus 1004 is configured to implement connection and communication between these components. The transceiver 1002 in this embodiment of this application is configured to perform signaling or data communication with another node device. The memory 1003 may include a volatile memory, for example, a non-volatile dynamic random access memory (NVRAM), a phase change random access memory (PRAM), or a magnetoresistive random access memory (MRAM). The memory 1003 may alternatively include a non-volatile memory, for example, at least one magnetic disk storage device, an electrically erasable programmable read-only memory (EEPROM), a flash storage device such as an NOR flash memory or a NAND flash memory, or a semiconductor device such as a solid state drive (SSD). Optionally, the memory 1003 may alternatively be at least one storage apparatus located far away from the foregoing processor 1001. Optionally, the memory 1003 may further store a group of computer program code or configuration information. Optionally, the processor 1001 may further execute the program stored in the memory 1003. The processor may cooperate with the memory and the transceiver to perform any method and function of the terminal device in the foregoing embodiments of this application.

Figure 11:
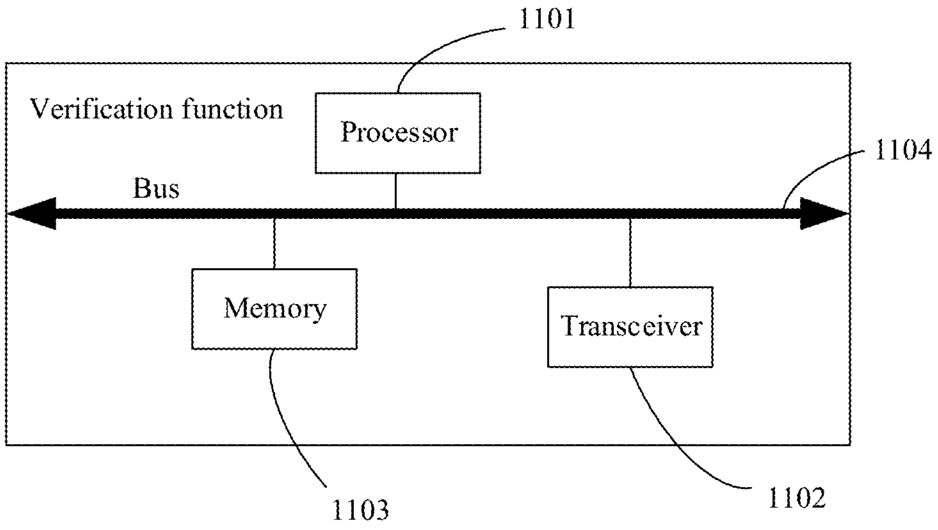
FIG. 11 is a diagram of a structure of a verification function according to an embodiment of this application.

FIG. 11 is a diagram of a structure of a verification function according to an embodiment of this application. The verification function may be used in the system shown in FIG. 1, to perform functions of the verification function in the foregoing method embodiments, or implement steps or procedures performed by the verification function in the foregoing method embodiments.

As shown in FIG. 11, the verification function includes a processor 1101 and a transceiver 1102. Optionally, the verification function further includes a memory 1103. The processor 1101, the transceiver 1102, and the memory 1103 may communicate with each other through an internal connection path, to transfer a control signal and/or a data signal. The memory 1103 is configured to store a computer program. The processor 1101 is configured to: invoke the computer program from the memory 1103 and run the computer program, to control the transceiver 1102 to receive or send a signal. Optionally, the verification function may further include an antenna, configured to send, by using a radio signal, uplink data or uplink control signaling output by the transceiver 1102.

The foregoing processor 1101 may correspond to the processing module in FIG. 9. The foregoing processor 1101 and the memory 1103 may be combined into a processing apparatus. The processor 1101 is configured to execute program code stored in the memory 1103 to implement the foregoing functions. In some embodiments, the memory 1103 may alternatively be integrated into the processor 1101, or may be independent of the processor 1101.

The foregoing transceiver 1102 may correspond to the sending module and the receiving module in FIG. 9, and may also be referred to as a transceiver unit or a transceiver module. The transceiver 1102 may include a receiver (or referred to as a receiver machine or a receiver circuit) and a transmitter (or referred to as a transmitter machine or a transmitter circuit). The receiver is configured to receive a signal, and the transmitter is configured to transmit a signal.

The verification function shown in FIG. 11 can implement processes related to the verification function in the method embodiments shown in FIG. 4*a* to FIG. 7. Operations and/or functions of modules in the verification function are respectively intended to implement corresponding procedures in the foregoing method embodiments. For details, refer to the descriptions in the foregoing method embodiments. To avoid repetition, detailed descriptions are properly omitted herein.

The foregoing processor 1101 may be configured to perform actions that are internally implemented by the verification function and that are described in the foregoing method embodiments. The transceiver 1102 may be configured to perform actions that are sent by the verification function to the terminal device or received by the verification function from the terminal device and that are described in the foregoing method embodiments. For details, refer to the descriptions in the foregoing method embodiments. Details are not described herein again.

The processor 1101 may be processors of various types mentioned above. A communication bus 1104 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 11, but this does not mean that there is only one bus or only one type of bus. The communication bus 1104 is configured to implement connection and communication between these components. The transceiver 1102 of the device in this embodiment of this application is configured to perform signaling or data communication with another device. The memory 1103 may be memories of various types mentioned above. Optionally, the memory 1103 may alternatively be at least one storage apparatus located far away from the foregoing processor 1101. The memory 1103 stores a group of computer program code or configuration information, and the processor 1101 executes the program in the memory 1103. The processor may cooperate with the memory and the transceiver to perform any method and function of the verification function in the foregoing embodiments of this application.

An embodiment of this application further provides a chip system. The chip system includes a processor, configured to support a terminal device or a verification function to implement the function in any one of the foregoing embodiments, for example, generating or processing the first response value in the foregoing methods. In a possible design, the chip system may further include a memory, and the memory is configured to store program instructions and data for the terminal device or the verification function. The chip system may include a chip, or may include a chip and another discrete component. An input and an output of the chip system respectively correspond to receiving and sending operations of the terminal device or the verification function in the method embodiments.

An embodiment of this application further provides a processing apparatus, including a processor and an interface. The processor may be configured to perform the method in the foregoing method embodiments.

The processing apparatus may be a chip. For example, the processing apparatus may be a field programmable gate array (FPGA), an application-specific integrated chip (ASIC), a system-on-chip (SoC), a central processing unit (CPU), a network processor (NP), a digital signal processing circuit (DSP), a microcontroller unit (MCU), a programmable controller (PLD), or another integrated chip.

In an implementation process, steps in the foregoing methods can be implemented by using a hardware integrated logical circuit in the processor, or by using instructions in a form of software. The steps of the methods disclosed with reference to embodiments of this application may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

According to the method provided in embodiments of this application, this application further provides a computer program product. The computer program product includes a computer program, and when the computer program is run on a computer, the computer is enabled to perform the method according to any one of the embodiments shown in FIG. 4*a* to FIG. 7.

According to the method provided in embodiments of this application, this application further provides a computer-readable medium. The computer-readable medium stores a computer program, and when the computer program is run on a computer, the computer is enabled to perform the method according to any one of the embodiments shown in FIG. 4*a* to FIG. 7.

According to the method provided in embodiments of this application, this application further provides a communication system. The communication system includes one or more terminal devices and one or more verification functions that are described above.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, an SSD), or the like.

The verification function and the terminal device in the foregoing apparatus embodiments correspond to the verification function or the terminal device in the method embodiments, and corresponding modules or units perform corresponding steps. For example, a receiving module and a sending module (a transceiver) perform receiving or sending steps in the method embodiments, and steps other than sending and receiving may be performed by a processing module (a processor). For a function of a module, refer to a corresponding method embodiment. There may be one or more processors.

In the several embodiments provided in this application, the disclosed system, apparatus, and method may be implemented in another manner. The described apparatus embodiments are merely examples. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a verification function, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely some implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, wherein the method comprises:

receiving a first command from a network device, wherein the first command comprises a first value, and the first command is a select command, a query command, a query repeat command, a query adjust command, or an acknowledgment command;

determining a first response value based on the first value and a security key;

sending a first request, wherein the first request comprises the first response value and a second value, and the first response value is used by a verification function to verify a terminal device;

receiving a first response message, wherein the first response message comprises a second response value that is determined based on the second value and the security key; and verifying the network device based on the second response value, wherein a second response message is sent to an access and mobility management function or a tag management function, the second response message comprises a derived key, the derived key is generated based on the security key, an electronic product code, and at least one of the first value or the second value, and the electronic product code is used to identify the terminal device.

2. The method according to claim 1, wherein the verifying the network device based on the second response value comprises:

determining a third response value based on the second value and the security key;

determining whether the second response value is the same as the third response value; and when the second response value is the same as the third response value, determining that the network device passes verification.

3. The method according to claim 1, wherein the first response message further comprises the electronic product code.

4. The method according to claim 1, wherein the first request further comprises the electronic product code.

5. The method according to claim 1, wherein the verification function comprises an application function, an authentication, authorization, and accounting function or a unified data management function.

6. A method, wherein the method comprises:

receiving a first request, wherein the first request comprises a first response value and a second value, the first response value is determined based on a security key and a first value comprised in a first command of a network device, and the first command is a select command, a query command, a query repeat command, a query adjust command, or an acknowledgment command;

verifying a terminal device based on the first response value;

determining a second response value based on the second value and the security key;

sending a first response message, wherein the first response message comprises the second response value, and the second response value is used by the terminal device to verify the network device; and sending a second response message to an access and mobility management function or a tag management function, wherein the second response message comprises a derived key, the derived key is generated based on the security key, an electronic product code, and at least one of the first value or the second value, and the electronic product code is used to identify the terminal device.

7. The method according to claim 6, wherein the verifying the terminal device based on the first response value comprises:

determining a third value, and determining a fourth response value based on the third value and the security key;

determining whether the first response value is the same as the fourth response value; and when the first response value is the same as the fourth response value, determining that the terminal device passes verification.

8. An apparatus, comprising at least one processor and at least one memory, wherein the at least one processor is coupled to the at least one memory, the at least one memory stores instructions which, when executed by the at least one processor, cause the apparatus to:

receive a first command from a network device, wherein the first command comprises a first value, and the first command is a select command, a query command, a query repeat command, a query adjust command, or an acknowledgment command;

determine a first response value based on the first value and a security key;

send a first request, wherein the first request comprises the first response value and a second value, and the first response value is used by a verification function to verify the apparatus;

receive a first response message, wherein the first response message comprises a second response value that is determined based on the second value and the security key; and verify the network device based on the second response value, wherein a second response message is sent to an access and mobility management function or a tag management function, the second response message comprises a derived key, the derived key is generated based on the security key, an electronic product code, and at least one of the first value or the second value, and the electronic product code is used to identify the apparatus.

9. The apparatus according to claim 8, wherein the apparatus is further configured to:

determine a third response value based on the second value and the security key;

determine whether the second response value is the same as the third response value; and when the second response value is the same as the third response value, determine that the network device passes verification.

10. The apparatus according to claim 8, wherein the first response message further comprises an electronic product code.

11. The apparatus according to claim 8, wherein the first request further comprises the electronic product code.

12. The apparatus according to claim 8, wherein the verification function comprises an application function, an authentication, authorization, and accounting function or a unified data management function.

13. An apparatus, comprising at least one processor and at least one memory, wherein the at least one processor is coupled to the at least one memory, the at least one memory stores instructions which, when executed by the at least one processor, cause the apparatus to:

receive a first request, wherein the first request comprises a first response value and a second value, the first response value is determined based on a security key and a first value comprised in a first command of a network device, and the first command is a select command, a query command, a query repeat command, a query adjust command, or an acknowledgment command;

verify a terminal device based on the first response value;

determine a second response value based on the second value and the security key;

send a first response message, wherein the first response message comprises the second response value, and the second response value is used by the terminal device to verify the network device; and send a second response message to an access and mobility management function or a tag management function, wherein the second response message comprises a derived key, the derived key is generated based on the security key, an electronic product code, and at least one of the first value or the second value, and the electronic product code is used to identify the terminal device.

14. The apparatus according to claim 13, wherein the apparatus is further configured to:

determine a third value, and determine a fourth response value based on the third value and the security key;

determine whether the first response value is the same as the fourth response value; and when the first response value is the same as the fourth response value, determine that the terminal device passes verification.

15. The apparatus according to claim 13, wherein the access and mobility management function and the tag management function are in a core network.

16. The apparatus according to claim 13, wherein the apparatus comprises a verification function.

17. The apparatus according to claim 16, wherein the verification function comprises an application function or an authentication, authorization, and accounting function.

18. The method according to claim 1, wherein the method is performed by the terminal device.

19. The method according to claim 18, wherein the terminal device is a tag.

20. The apparatus according to claim 8, wherein the apparatus is a terminal device.

* * * * *